US009509184B2

(12) United States Patent
Duncan et al.

(10) Patent No.: US 9,509,184 B2
(45) Date of Patent: Nov. 29, 2016

(54) APPLIANCE, ROTOR AND MAGNET ELEMENT

(71) Applicant: FISHER & PAYKEL APPLIANCES LIMITED, Auckland (NZ)

(72) Inventors: Gerald David Duncan, Auckland (NZ); Christian John Wade Gianni, Auckland (NZ); John Julian Aubrey Williams, Auckland (NZ); Kerrin Edmund Burnnand, Auckland (NZ); Gregory Paul Hill, Auckland (NZ)

(73) Assignee: FISHER & PAYKEL APPLIANCES LIMITED, Auckland (NZ)

( * ) Notice: Subject to any disclaimer, the term of this patent is extended or adjusted under 35 U.S.C. 154(b) by 211 days.

(21) Appl. No.: 13/967,220

(22) Filed: Aug. 14, 2013

(65) Prior Publication Data

US 2013/0328453 A1    Dec. 12, 2013

Related U.S. Application Data

(63) Continuation of application No. 12/671,387, filed as application No. PCT/NZ2008/000195 on Aug. 1, 2008, now abandoned.

(60) Provisional application No. 60/953,243, filed on Aug. 1, 2007.

(51) Int. Cl.
| | | |
|---|---|---|
| *H02K 1/27* | (2006.01) | |
| *H02K 7/14* | (2006.01) | |
| *H02K 15/03* | (2006.01) | |

(52) U.S. Cl.
CPC .............. *H02K 1/2786* (2013.01); *H02K 7/14* (2013.01); *H02K 15/03* (2013.01); *Y10T 29/49012* (2015.01)

(58) Field of Classification Search
CPC ................... H02K 1/2786; H02K 1/00–1/34; H02K 15/00–15/165
USPC .................. 310/156.01–156.84; 29/598, 596
See application file for complete search history.

(56) References Cited

U.S. PATENT DOCUMENTS

| | | |
|---|---|---|
| 2,964,793 A | 12/1960 | Blume |
| 3,755,515 A | 8/1973 | Cochardt |

(Continued)

FOREIGN PATENT DOCUMENTS

| | | |
|---|---|---|
| EP | 1548171 A2 | 6/2005 |
| EP | 1739811 | 1/2007 |

(Continued)

OTHER PUBLICATIONS

EPO Machine Translation, SHIGA, WO 3088451 A1, Oct. 23, 2003.*

(Continued)

*Primary Examiner* — Thomas Truong
(74) *Attorney, Agent, or Firm* — Knobbe, Martens, Olson & Bear, LLP

(57) ABSTRACT

A magnet element (37) and a method of its manufacture for assembly into a rotor (38), the magnet element (37) having magnetic domains aligned anisotropically to form a domain alignment pattern (42), wherein the magnetic domain alignment pattern (42) in the magnet element (37) has an orientation that varies substantially continuously across at least part of the magnet element (37) between its lateral edges from at least partially radial to at least partially tangential.

24 Claims, 29 Drawing Sheets

(56) References Cited

U.S. PATENT DOCUMENTS

| | | |
|---|---|---|
| 4,010,434 A | 3/1977 | Kools |
| 4,536,230 A | 8/1985 | Landa et al. |
| 4,547,758 A | 10/1985 | Shimizu et al. |
| 4,703,210 A | 10/1987 | Abukawa et al. |
| 4,774,428 A * | 9/1988 | Konecny ............ 310/198 |
| 4,812,692 A | 3/1989 | Arita |
| 4,888,512 A | 12/1989 | Shimizu |
| 5,204,569 A | 4/1993 | Hino et al. |
| 5,289,066 A | 2/1994 | Clark |
| 5,349,258 A | 9/1994 | Leupold et al. |
| 5,705,902 A | 1/1998 | Merritt et al. |
| 5,723,933 A * | 3/1998 | Grundl et al. ............ 310/266 |
| 6,111,332 A | 8/2000 | Post |
| 6,707,213 B2 | 3/2004 | Fujita |
| 6,794,779 B2 * | 9/2004 | Ma et al. ............ 310/80 |
| 6,851,496 B2 | 2/2005 | Prucher |
| 6,858,962 B2 | 2/2005 | Post |
| 6,906,446 B2 | 6/2005 | Post |
| 7,042,126 B2 | 5/2006 | Sidey et al. |
| 7,204,012 B2 | 4/2007 | Kloepzig et al. |
| 7,459,808 B2 | 12/2008 | Hol et al. |
| 7,557,486 B2 | 7/2009 | Choi et al. |
| 2003/0118467 A1 | 6/2003 | Sato et al. |
| 2004/0046471 A1 | 3/2004 | Kim et al. |
| 2005/0174004 A1 * | 8/2005 | Takehara et al. ........ 310/156.43 |
| 2005/0225192 A1 | 10/2005 | Kloepzig et al. |
| 2005/0231057 A1 | 10/2005 | Kloepzig et al. |
| 2005/0241346 A1 * | 11/2005 | Choi ............ 68/140 |
| 2006/0108881 A1 | 5/2006 | Hauger et al. |
| 2006/0110484 A1 | 5/2006 | Murata et al. |
| 2006/0113857 A1 * | 6/2006 | Honkura et al. ........ 310/156.43 |
| 2006/0119213 A1 | 6/2006 | Ju |
| 2006/0139137 A1 | 6/2006 | Honkura et al. |
| 2006/0186751 A1 | 8/2006 | Kim et al. |
| 2006/0220484 A1 | 10/2006 | Stephens |
| 2007/0035192 A1 | 2/2007 | Jeon et al. |
| 2007/0170801 A1 | 7/2007 | Sato et al. |
| 2007/0210659 A1 | 9/2007 | Long |
| 2008/0124235 A1 | 5/2008 | Honkura et al. |
| 2008/0265894 A1 | 10/2008 | Snyder et al. |

FOREIGN PATENT DOCUMENTS

| | | | |
|---|---|---|---|
| EP | 1750350 | 2/2007 | |
| JP | 2006-080115 | 3/2006 | |
| WO | WO 03088451 | 10/2003 | |
| WO | WO 03088451 A1 * | 10/2003 | ............ H02K 1/27 |
| WO | WO 2006/075903 | 7/2006 | |
| WO | WO 2006075903 A2 * | 7/2006 | |
| WO | WO 2007/091727 | 8/2007 | |
| WO | WO 2008/082057 | 7/2008 | |

OTHER PUBLICATIONS

GITAM, Department of Engineering Physics, Domain theory of Ferromagnetism, Feb. 26, 2016.*
Cullity, B. D. and Graham, Introduction to Magnetic Materials, Second Edition, p. 197-202.*
Build a Halbach Array (retrieved from http://www.matchrockets.com/ether/halbach.html on Aug. 2, 2007) in 4 pages.
Campbell, Peter "Permanent magnet materials and their applications" (1994) in 11 pages.
Halbach, K. "Design of Permanent Multipole Magnets with Oriented Rare Earth Cobalt Material" *Nuclear Instruments and Methods* 160: 1-10 (1980).
International Search Report completed on Oct. 23, 2008 in 3 pages.
Switched Reluctance Motor Drives (retrieved from http://www.fleadh.co.uk/srm.htm on Aug. 2, 2007) in 5 pages.
TDK, "Ferrite Magnets" (Nov. 4, 2008) in 3 pages.
The University of Sheffiled Electrical Machines & Drives Research Group "Case Study: Halbach cylinders applied to brushless servomotors" (1999) in 12 pages.
Wikipedia "Halbach Cylinder" (retrieved from http://en.wikipedia.org/wiki/Halbach_cylinder on Aug. 2, 2007) in 2 pages.
Written Opinion of the International Searching Authority completed on Oct. 23, 2008 in 3 pages.
Zhu, Z. "Halbach permanent magnet machines and applications: a review" *IEE Proc.-Electr. Power Appl* 148: 299-308 (2009).

* cited by examiner

30 Degree Edge Angle

60 Degree Edge Angle

90 Degree Edge Angle

APPLIANCE, ROTOR AND MAGNET ELEMENT

CROSS-REFERENCE TO RELATED APPLICATIONS

This application is a continuation application of U.S. application Ser. No. 12/671,387, filed on Jan. 29, 2010, which is the national stage application of PCT/NZ2008/000195, filed on Aug. 1, 2008, which claims priority to U.S. Provisional Application No. 60/953,243, filed on Aug. 1, 2007. The disclosures of these prior applications are incorporated by reference in their entirety.

FIELD OF THE INVENTION

The present invention relates to electric motors and magnet elements for use in such motors, and particularly motors having an external rotor of a type that are used as the main drive motor for a domestic laundry machine or other apparatus.

BACKGROUND OF THE INVENTION

EP 1548171 describes a drive system for washing machines. The drive system comprises a motor with a large diameter shallow stator and a rotor with magnets external to the stator. The stator is supported on the end of a washing tub as shown in FIG. 2 of that application. The stator has an aperture for a drive shaft to pass through. As shown in FIGS. 2 and 16 of EP patent application 1548171, a rotor, which is to be fixed to the rotating drum of a washing machine, has a ring of permanent magnet material supported on the inside of a steel backing ring. A frame extends between the hub of the rotor (through which the shaft can extend) and the steel backing ring. The backing ring and frame may be formed together. The permanent magnet material is made of a set of curved permanent magnet elements. The permanent magnet material is magnetised after physical construction of the rotor. A typical rotor has more than 30 poles magnetised into the ring of magnetic material. The polarity of the poles alternates proceeding around the ring.

The magnet elements are typically made of hard ferrite permanent magnet material. The magnets may be isotropic or anisotropic. In anisotropic, the magnet elements are formed with their magnetic domains aligned across the thickness of the magnet so as to be aligned radially generally as shown by arrow "A" in FIG. 1 of the present application. Magnetisation of the rotor follows this pattern to create radial magnetic field lines through the thickness of the magnet, represented by the magnetic flux lines or paths in FIG. 1. This results in a pattern of poles on the outside face of the magnets (adjacent the backing steel) that is the inverse of the pattern of poles on the inside of the face of the magnets (facing radial inwards).

In the case of radial magnetisation, the portion of each magnet close to the interface between magnets is known to provide little benefit in terms of the flux coupled from the rotor into the stator and can typically be removed with little loss in torque production.

Halbach arrays have been created to at least partially alleviate this problem. One example of a Halbach array is an arrangement of magnets with their respective directions of magnetisation oriented as shown in FIG. 2a of the present application. As shown in FIG. 2b of the present application, a total resulting magnetic flux field is produced that reduces the magnetic flux that couples out the back face of the magnetic ring. Isotropic or anisotropic magnetic sections can be used in such an array. Anisotropic sections have magnetic domains aligned in one direction, whereas isotropic sections have magnetic domains arranged randomly. FIG. 2c shows a portion of an "ideal" Halbach array resulting magnetic flux field where a large or infinite number of magnetic elements are formed into a Halbach array.

It has been proposed that a single piece isotropic ring can be magnetised to produce a Halbach array "style" magnetic field. The sections of single piece ring are magnetised using an external magnetic field. Performance of the isotropic ring will be limited relative to radially magnetised anisotropic magnets due to the reduced magnetic strength of the isotropic magnets.

SUMMARY OF THE INVENTION

It is an object of the present invention to provide a magnet element, or a rotor or a motor with such an element, or an appliance that uses such a motor or rotor, where the magnet element has pre-aligned domains to enable production of an improved resulting magnetic flux field in a rotor or part of a rotor, or to at least provide the industry with a useful choice.

In one aspect the present invention may be said to consist in a rotor comprising: a plurality of magnet elements with two lateral edges each with magnetic domains aligned anisotropically to form a domain alignment pattern, the plurality of magnets being arranged to form a permanent magnet ring with an inner face and an outer face, said permanent magnet ring being between 150 mm and 400 mm in diameter, less than 100 mm in height and less than 20 mm thick, and a rigid support holding said magnet elements in said ring arrangement, wherein the magnetic domain alignment pattern in each magnet element has an orientation that varies substantially continuously across at least part of the magnet element between its lateral edges from an orientation that has a predominant radial component at a pole of the magnet element to an orientation that has a least some tangential component at one lateral edge of the magnet element, wherein the magnet elements are magnetised to produce a resulting magnetic flux field.

Preferably, the magnet elements have a chamfer at the intersection of each lateral edge with the front edge, wherein the front edge is the edge at the inner face of the rotor.

Preferably, each magnet element has the pole positioned between the magnet element's lateral edges and the magnetic domain alignment pattern in each magnet element has an orientation that varies substantially continuously across the width of the magnet element from an orientation that has a predominant radial component at the pole of the magnet element to an orientation that has a least some tangential component at both lateral edges of the magnet element.

Preferably, at both lateral edges, the orientation of the magnetic domain alignment pattern has a significant tangential component.

Preferably, at both lateral edges the significant tangential component results in the magnetic domain alignment pattern having an orientation of at least 15 degrees with respect to the lateral edges.

Preferably, both lateral edges the significant tangential component result in the magnetic domain alignment pattern having an orientation of between 20 to 35 degrees, and more preferably substantially 30 degrees, with respect to the lateral edges.

Preferably, at both lateral edges, the orientation of the magnetic domain alignment pattern has a predominant tangential component.

Preferably, each magnet element has the pole positioned at or towards one lateral edge.

Preferably, the orientation of the magnetic domain alignment pattern has a significant tangential component at the lateral edge.

Preferably, the orientation varies substantially non-linearly over the magnet element.

Preferably, the radial and tangential components of the orientation of the magnetic domain alignment pattern within the magnet element varies sinusoidally according to:

$$V_R = \cos(\theta), \text{ and}$$

$$V_T = \sin(\theta)$$

Where $V_R$ and $V_T$ are the radial and tangential components of the orientation respectively and $\theta$ is the angular position across the magnet element, varying from substantially −90 degrees at one lateral edge to substantially +90 degrees at the opposite lateral edge.

Preferably, one or more spacer elements are arranged between the lateral edges of one or more proximate magnetic elements arranged to form the permanent magnet ring.

Preferably, the spacer elements are magnetic with a magnetic domain alignment pattern with a substantially tangential orientation across the spacer element.

Preferably, the resulting magnetic flux field is created by applying an external magnetic flux field that has a geometry within each magnet element that is substantially similar to the magnetic domain alignment pattern within that element.

Preferably, the resulting magnetic flux field is a Halbach-style flux field.

Preferably, the resulting magnetic flux field has poles with alternating polarity spaced around the ring, the poles being aligned radially with respect to the permanent magnet ring, and wherein the resulting magnetic flux field of the permanent magnet ring traverses between adjacent poles of opposite polarities and between those poles is focused to extend beyond the boundary defined by the inner face, but remain at least partially constrained within the boundary defined by the outer face of the permanent magnet ring, Preferably, the magnetic domain alignment pattern assists creation of a stronger resulting magnetic flux field when the magnet elements are magnetised.

Preferably, the portion of the resulting magnetic flux field in each magnet element has an orientation that varies substantially continuously over the magnet element wherein: across the width of the magnet element, the orientation varies from an orientation that has a predominant radial component at the pole to an orientation that has a predominant tangential component at the edges of the magnet element adjacent other magnet elements in the permanent magnet ring, and across the depth of the magnet element, the orientation varies from an orientation that has a predominant radial component at an edge corresponding to the inner face of the permanent magnet ring to an orientation that has a predominant tangential component at an edge corresponding to the outer face of the permanent magnet ring.

Preferably, the orientation varies substantially non-linearly over the magnet element.

Preferably, the portion of the resulting magnetic flux field between adjacent poles extending beyond the boundary defined by the inner face of the permanent magnet ring magnet element has an orientation that varies continuously wherein: between the poles, the orientation varies from an orientation that has a predominant radial component at the pole to an orientation that has a predominant tangential component at the mid-point between the poles, and extending radially from the inner face, the orientation varies from an orientation that has a predominant radial component at an inner face to an orientation that has an increasingly tangential component with distance from the inner face.

Preferably, the orientation varies substantially non-linearly between the poles and extending beyond the inner face.

Preferably, the radial and tangential components of the orientation of the resulting magnetic flux field at or proximate the inner surface of the magnet element varies sinusoidally according to:

$$V_R = \cos(\theta), \text{ and}$$

$$V_T = \sin(\theta)$$

Where $V_R$ and $V_T$ are the radial and tangential components of the orientation respectively and $\theta$ is the angular position across the magnet element, varying from substantially −90 degrees at one lateral edge to substantially +90 degrees at the opposite lateral edge.

Preferably, for each magnet element, the magnetic domains were aligned during production of the magnet element.

Preferably, for each magnet element, the magnetic domains were aligned during production using a press or injection moulding tool comprising one or more elements defining a cavity; and an apparatus for applying a magnetic flux field, wherein the apparatus produces a magnetic field in the cavity similar in nature to the desired magnetic domain alignment pattern in the element.

Preferably, the rotor is utilised in the drive motor of a washing machine comprising an electronically commutated motor, a stator of the motor having windings energisable to cause rotation of the rotor, said stator being coupled to a non-rotating tub or housing of the washing machine, said rotor being coupled to a rotating drum of the washing machine.

Preferably, the washing machine is a top loading washing machine comprising: an outer wrapper, a tub suspended in the outer wrapper, and a rotating drum in the tub.

Preferably, the washing machine is a horizontal axis machine comprising: an outer wrapper, a rotating drum housing, and a rotating drum in the housing.

Preferably, the washing machine is a horizontal axis machine with top loading access comprising: an outer wrapper, a tub, and a rotating drum in the tub.

Preferably, utilised in a power generation apparatus.

In another aspect the present invention may be said to consist in a motor for use in a washing machine, said motor comprising: a stator having at least three phase windings, each phase winding being formed on a plurality of radially extending stator teeth, a rotor as defined in any preceding claim, concentric with said stator with the permanent magnet ring outside said stator teeth and said rotor poles facing the ends of said stator teeth.

In another aspect the present invention may be said to consist in a method of producing a rotor comprising the steps of: producing a plurality of magnet elements comprising permanent magnet material with two lateral edges each with magnetic domains aligned anisotropically to form a domain alignment pattern, wherein the magnetic domain alignment pattern in each magnet element has an orientation that varies substantially continuously across at least part of the magnet element between its lateral edges from an orientation that has a predominant radial component at a pole of the magnet element to an orientation that has a least some tangential component at one lateral edge of the magnet element, arranging and retaining the magnet elements into a permanent magnet ring in a rigid support, and magnetising the magnet elements to produce a resulting magnetic flux field.

Preferably, the magnet elements have a chamfer at the intersection of each lateral edge with the front edge, wherein the front edge is the edge at the inner face of the rotor.

Preferably, the step of producing the plurality of magnet element comprises applying an external magnetic flux field to each magnet element to align the magnetic domains.

Preferably, each magnet element has the pole positioned between the magnet element's lateral edges and applying the external magnetic flux field to a magnet elements aligns its magnetic domains such that the magnetic domain alignment pattern in the magnet element has an orientation that varies substantially continuously across the width of the magnet element from an orientation that has a predominant radial component at the pole of the magnet element to an orientation that has a least some tangential component at both lateral edges of the magnet element.

Preferably, at both lateral edges, the orientation of the magnetic domain alignment pattern has a significant tangential component.

Preferably, at both lateral edges the significant tangential component results in the magnetic domain alignment pattern having an orientation of at least 15 degrees with respect to the lateral edges.

Preferably, at both lateral edges the significant tangential component result in the magnetic domain alignment pattern having an orientation of between 20 to 35 degrees, and more preferably substantially 30 degrees, with respect to the lateral edges.

Preferably, at both lateral edges, the orientation of the magnetic domain alignment pattern has a predominant tangential component.

Preferably, each magnet element has the pole positioned at or towards one lateral edge.

Preferably, the orientation varies substantially non-linearly over the magnet element.

Preferably, the radial and tangential components of the orientation of the magnetic domain alignment pattern within the magnet element varies sinusoidally according to:

$$V_R = \cos(\theta), \text{ and}$$

$$V_T = \sin(\theta)$$

Where $V_R$ and $V_T$ are the radial and tangential components of the orientation respectively and $\theta$ is the angular position across the magnet element, varying from substantially −90 degrees at one lateral edge to substantially +90 degrees at the opposite lateral edge.

Preferably, the resulting magnetic flux field is created by applying an external magnetic flux field that has a geometry within each magnet element that is substantially similar to the magnetic domain alignment pattern within that element.

Preferably, the resulting magnetic flux field is a Halbach-style flux field.

Preferably, the resulting magnetic flux field has poles with alternating polarity spaced around the ring, the poles being aligned radially with respect to the permanent magnet ring, and wherein the resulting magnetic flux field of the permanent magnet ring traverses between adjacent poles of opposite polarities and between those poles is focused to extend beyond the boundary defined by the inner face, but remain at least partially constrained within the boundary defined by the outer face of the permanent magnet ring, Preferably, the magnetic domain alignment pattern assists creation of a stronger resulting magnetic flux field when the magnet elements are magnetised.

Preferably, the portion of the resulting magnetic flux field in each magnet element has an orientation that varies substantially continuously over the magnet element wherein: across the width of the magnet element, the orientation varies from an orientation that has a predominant radial component at the pole to an orientation that has a predominant tangential component at the edges of the magnet element adjacent other magnet elements in the permanent magnet ring, and across the depth of the magnet element, the orientation varies from an orientation that has a predominant radial component at an edge corresponding to the inner face of the permanent magnet ring to an orientation that has a predominant tangential component at an edge corresponding to the outer face of the permanent magnet ring.

Preferably, the orientation varies substantially non-linearly over the magnet element.

Preferably, the portion of the resulting magnetic flux field between adjacent poles extending beyond the boundary defined by the inner face of the permanent magnet ring magnet element has an orientation that varies continuously wherein: between the poles, the orientation varies from an orientation that has a predominant radial component at the pole to an orientation that has a predominant tangential component at the mid-point between the poles, and extending radially from the inner face, the orientation varies from an orientation that has a predominant radial component at an inner face to an orientation that has an increasingly tangential component with distance from the inner face.

Preferably, the orientation varies substantially non-linearly between the poles and extending beyond the inner face.

Preferably, the radial and tangential components of the orientation of the resulting magnetic flux field at or proximate the inner surface of the magnet element varies sinusoidally according to:

$$V_R = \cos(\theta), \text{ and}$$

$$V_T = \sin(\theta)$$

Where $V_R$ and $V_T$ are the radial and tangential components of the orientation respectively and $\theta$ is the angular position across the magnet element, varying from substantially −90 degrees at one lateral edge to substantially +90 degrees at the opposite lateral edge.

In another aspect the present invention may be said to consist in a rotor comprising: a plurality of magnet elements with two lateral edges each with magnetic domains aligned anisotropically to form a domain alignment pattern, the plurality of magnets being arranged to form a permanent magnet ring with an inner face and an outer face, and a rigid support holding said magnet elements in said ring arrangement, wherein the magnetic domain alignment pattern in each magnet element has an orientation that varies substantially continuously across at least part of the magnet element between its lateral edges from an orientation that has a predominant radial component at a pole of the magnet element to an orientation that has a least some tangential component at one lateral edge of the magnet element, wherein the magnet elements are magnetised to produce a resulting magnetic flux field.

In another aspect the present invention may be said to consist in a magnet element for assembly into a ring of magnet elements to form part of a rotor, the magnet element having two lateral edges each with magnetic domains aligned anisotropically to form a domain alignment pattern, wherein the magnetic domain alignment pattern in the magnet element has an orientation that varies substantially continuously across at least part of the magnet element between its lateral edges from an orientation that has a predominant radial component at a pole of the magnet element to an orientation that has a least some tangential component at one lateral edge of the magnet element.

Preferably the element has a chamfer at the intersection of each lateral edge with a front edge, wherein the front edge is the edge at the inner face of the rotor.

Preferably, the pole is positioned between the magnet element's lateral edges and the magnetic domain alignment pattern in each magnet element has an orientation that varies substantially continuously across the width of the magnet element from an orientation that has a predominant radial component at the pole of the magnet element to an orientation that has a least some tangential component at both lateral edges of the magnet element.

Preferably, at both lateral edges, the orientation of the magnetic domain alignment pattern has a significant tangential component.

Preferably, at both lateral edges the significant tangential component results in the magnetic domain alignment pattern having an orientation of at least 15 degrees with respect to the lateral edges.

Preferably, at both lateral edges the significant tangential component result in the magnetic domain alignment pattern having an orientation of between 20 to 35 degrees, and more preferably substantially 30 degrees, with respect to the lateral edges.

Preferably, at both lateral edges, the orientation of the magnetic domain alignment pattern has a predominant tangential component.

Preferably, each magnet element has a pole positioned at or towards one lateral edge.

Preferably, the orientation of the magnetic domain alignment pattern has a significant tangential component at the lateral edge.

Preferably, the orientation varies substantially non-linearly over the magnet element.

Preferably, the radial and tangential components of the orientation of the magnetic domain alignment pattern within the magnet element varies sinusoidally according to:

$$V_R = \cos(\theta), \text{ and}$$

$$V_T = \sin(\theta)$$

Where $V_R$ and $V_T$ are the radial and tangential components of the orientation respectively and $\theta$ is the angular position across the magnet element, varying from substantially −90 degrees at one lateral edge to substantially +90 degrees at the opposite lateral edge.

Preferably, the resulting magnetic flux field is created by applying an external magnetic flux field that has a geometry within each magnet element that is substantially similar to the magnetic domain alignment pattern within that element.

Preferably, the resulting magnetic flux field is a Halbach-style flux field.

Preferably, the resulting magnetic flux field has poles with alternating polarity spaced around the ring, the poles being aligned radially with respect to the permanent magnet ring, and wherein the resulting magnetic flux field of the permanent magnet ring traverses between adjacent poles of opposite polarities and between those poles is focused to extend beyond the boundary defined by the inner face, but remain at least partially constrained within the boundary defined by the outer face of the permanent magnet ring, Preferably, the magnetic domain alignment pattern assists creation of a stronger resulting magnetic flux field when the magnet elements are magnetised.

Preferably, the portion of the resulting magnetic flux field in each magnet element has an orientation that varies substantially continuously over the magnet element wherein: across the width of the magnet element, the orientation varies from an orientation that has a predominant radial component at the pole to an orientation that has a predominant tangential component at the edges of the magnet element adjacent other magnet elements in the permanent magnet ring, and across the depth of the magnet element, the orientation varies from an orientation that has a predominant radial component at an edge corresponding to the inner face of the permanent magnet ring to an orientation that has a predominant tangential component at an edge corresponding to the outer face of the permanent magnet ring.

Preferably, the orientation varies substantially non-linearly over the magnet element.

Preferably, the portion of the resulting magnetic flux field between adjacent poles extending beyond the boundary defined by the inner face of the permanent magnet ring magnet element has an orientation that varies continuously wherein: between the poles, the orientation varies from an orientation that has a predominant radial component at the pole to an orientation that has a predominant tangential component at the mid-point between the poles, and extending radially from the inner face, the orientation varies from an orientation that has a predominant radial component at an inner face to an orientation that has an increasingly tangential component with distance from the inner face.

Preferably, the orientation varies substantially non-linearly between the poles and extending beyond the inner face.

Preferably, the radial and tangential components of the orientation of the resulting magnetic flux field at or proximate the inner surface of the magnet element varies sinusoidally according to:

$$V_R = \cos(\theta), \text{ and}$$

$$V_T = \sin(\theta)$$

Where $V_R$ and $V_T$ are the radial and tangential components of the orientation respectively and $\theta$ is the angular position across the magnet element, varying from substantially −90 degrees at one lateral edge to substantially +90 degrees at the opposite lateral edge.

In another aspect the present invention may be said to consist in a method of producing a magnet element comprising aligning the magnetic domains of the element in the manner defined above.

Preferably, comprising producing a magnet element in a press or injection moulder from magnetic material, and applying a magnetic flux field approximately in the direction of the desired magnetic domain alignment pattern.

In another aspect the present invention may be said to consist in a rotor comprising: a plurality of magnet elements with two lateral edges each with magnetic domains aligned anisotropically to form a domain alignment pattern, the plurality of magnets being arranged to form a permanent magnet arrangement, and a rigid support holding said magnet elements in said arrangement, wherein the magnetic domain alignment pattern in each magnet element has an orientation that varies substantially continuously across at least part of the magnet element between its lateral edges from an orientation that has at least some tangential component at a point in the magnet element to an orientation that has a predominant radial component at poles positioned at the lateral edges of the magnet element, wherein the magnet elements are magnetised to produce a resulting magnetic flux field.

In another aspect the present invention may be said to consist in a magnet element for assembly into a ring of magnet elements to form part of a rotor, the magnet element having two lateral edges each with magnetic domains aligned anisotropically to form a domain alignment pattern, wherein the magnetic domain alignment pattern in the magnet element has an orientation that varies substantially continuously across at least part of the magnet element between its lateral edges from an orientation that has at least some tangential component at a point in the magnet element to an orientation that has a predominant tangential component at poles positioned at the lateral edges of the magnet element.

In another aspect the present invention may be said to consist in a rotor comprising: a plurality of magnet elements with two lateral edges each with magnetic domains aligned anisotropically to form a domain alignment pattern, the plurality of magnets being arranged to form a permanent magnet ring with an inner face and an outer face, and a rigid support holding said magnet elements in said ring arrangement, wherein the magnetic domain alignment pattern in each magnet element has an orientation that varies substantially continuously across at least part of the magnet element between its lateral edges from an orientation that has a predominant radial component at a pole of the magnet element positioned between the lateral edges to an orientation that has a least some tangential component at the lateral edges of the magnet element, wherein the magnet elements are magnetised to produce a resulting magnetic flux field.

Preferably, the magnetic domains are substantially aligned as shown in one of FIGS. 4a to 4f or 15a to 15d.

Preferably, the magnetic domain alignment pattern deviates from the Halbach-style resulting magnetic flux field.

Preferably the magnetic domain alignment pattern deviates from the Halbach-style resulting magnetic flux field.

Preferably, the magnetic domain alignment pattern deviates from the Halbach-style resulting magnetic flux field.

Preferably, for each magnet element, the magnetic domains were aligned during production of the magnet element.

Preferably, for each magnet element, the magnetic domains were aligned during production using a press or injection moulding tool comprising one or more elements defining a cavity, and an apparatus for applying a magnetic flux field, wherein the apparatus produces a magnetic field in the cavity similar in nature to the desired magnetic domain alignment pattern in the element.

An anisotropic magnet element in accordance with the present invention can, when arranged in a rotor, result in or allow production of a Halbach-style resulting magnetic flux field that is much stronger than such a flux field produced in an isotropic or radially aligned anisotropic magnet. Therefore, in aligning the magnetic domains as described to create an anisotropic Halbach magnetised rotor, the resulting flux field is much stronger than that achievable by the previously alternatively proposed isotropic magnet ring or an equivalent radially magnetised anisotropic ring.

This provides a higher performance rotor/motor. Low togging is also obtainable.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION OF THE PREFERRED EMBODIMENTS

Figure 1:
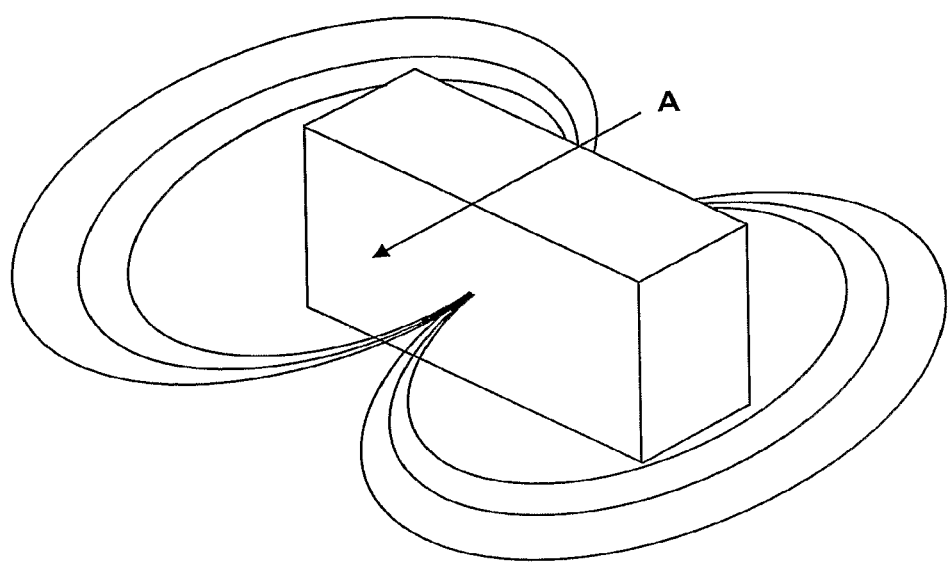
FIG. 1 shows a typical magnet element for a rotor.
Figure 2A:
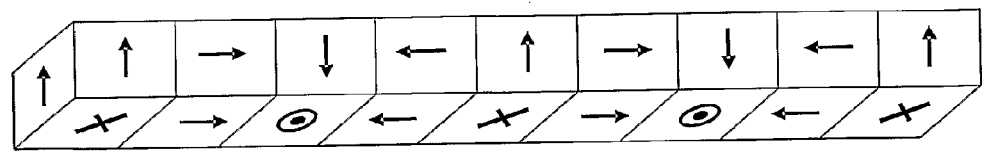
FIG. 2a shows a Halbach array with a finite number of elements.
Figure 2B:
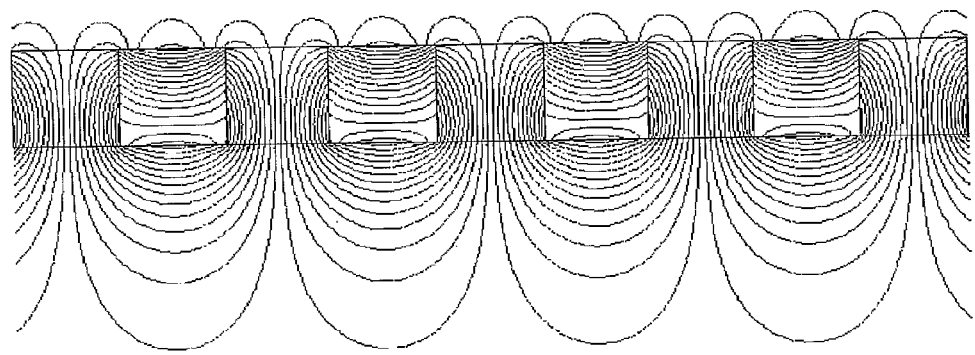
FIG. 2b shows the resulting magnetic flux field of the Halbach array in FIG. 2a, FIG. 2c shows a portion of a resulting magnetic flux field of an ideal Halbach array with a large or infinite number of elements.
Figure 2C:
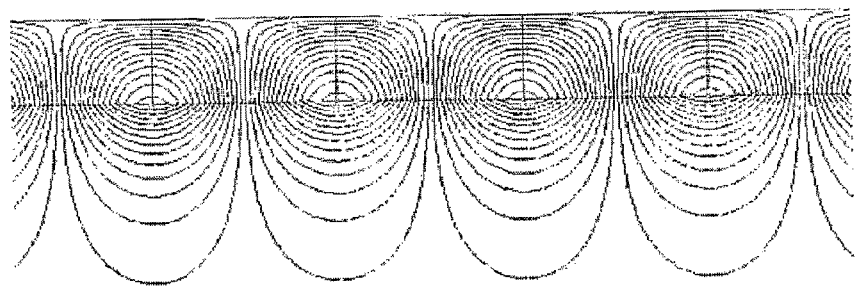
Figure 3A:
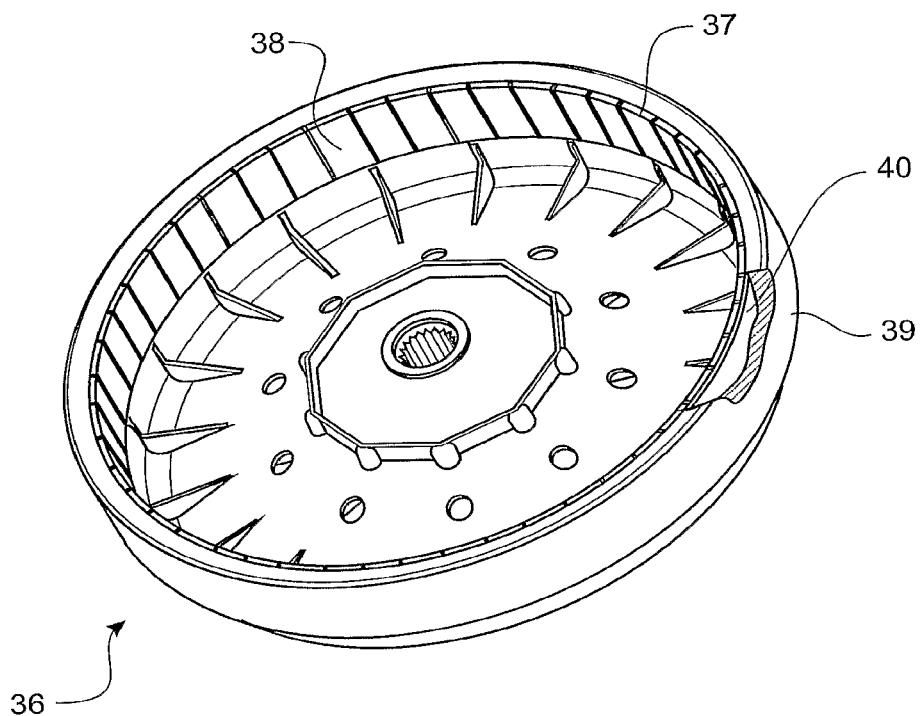
FIGS. 3a-3c show a rotor and stator, where the rotor incorporates a magnet element according to an embodiment of the invention.
Figure 3B:
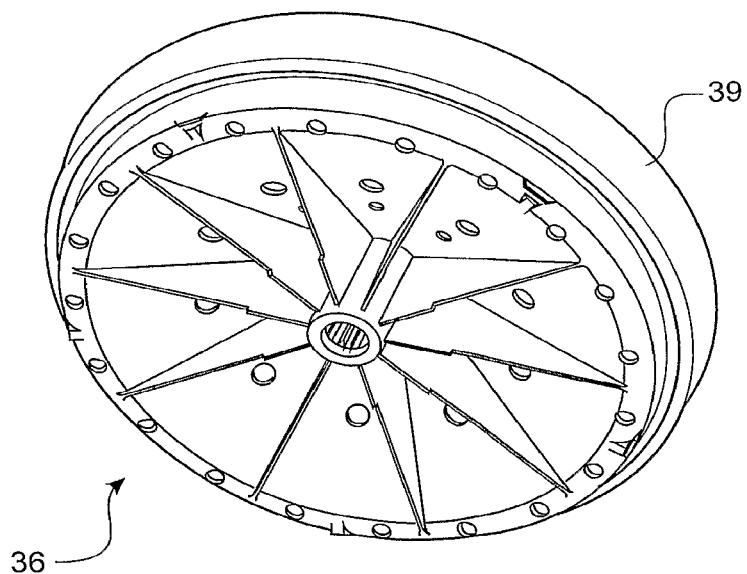
Figure 3C:
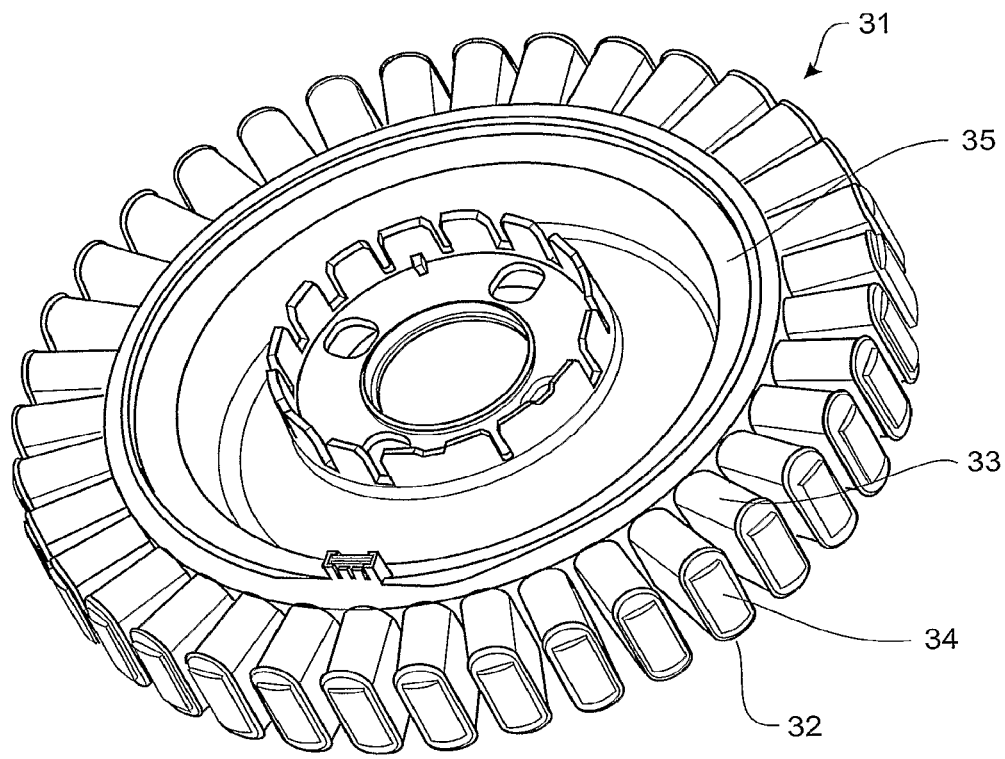

In one embodiment of the invention, a motor is provided such as that shown diagrammatically in FIGS. 3a to 3c. FIGS. 3a, 3b show the top and bottom of the rotor 36, while FIG. 3c shows the stator 31. The motor could be used in a washing machine, for example. The stator 31 comprises a number of poles e.g. 32, each pole comprising a coil or winding 33 wound around a radially extending core or tooth 34. The windings are typically arranged to form multiple sets of windings, or phases. Three phases are commonly used. Each tooth extends from an annular ring 35 or other suitable support frame. Each winding may be independently energised. The stator core can be formed from any suitable material.

The rotor 36 comprises a number of, hard ferrite or neodymium-iron-boron permanent magnet elements, e.g. 37, arranged to form a permanent magnet ring 38 of such elements. The permanent magnet elements 37 could also be comprised of a blend of hard ferrite and neodymium-iron-boron material or other magnetic material such as, but not limited to, Samarium-cobalt. Alternatively the permanent magnet elements 37 could comprise a blend of these magnet materials and plastic material. The ring 38 of magnetic material can be supported by a rigid rotor support or housing 39. This may comprise an over moulded plastics annular ring, with a plastics hub. Alternatively, the housing could comprise pressed steel 39a (as in the rotor of FIG. 3e) with the magnet elements attached therein. A single or multiple piece or multiple layer laminated backing ring 40 (see FIG. 3a) could optionally be provided to increase the resulting magnetic flux field produced by the magnetic material. Preferably, the ring of permanent magnetic material 38 has a diameter of between 150 mm and 400 mm, a height being less than 100 mm. Each said section (and said ring) is preferably less than 20 mm thick. It will be appreciated by those skilled in the art that there are many possible variations on the construction of a stator 31 and rotor 36 for use in a washing machine motor.

Figure 3D:
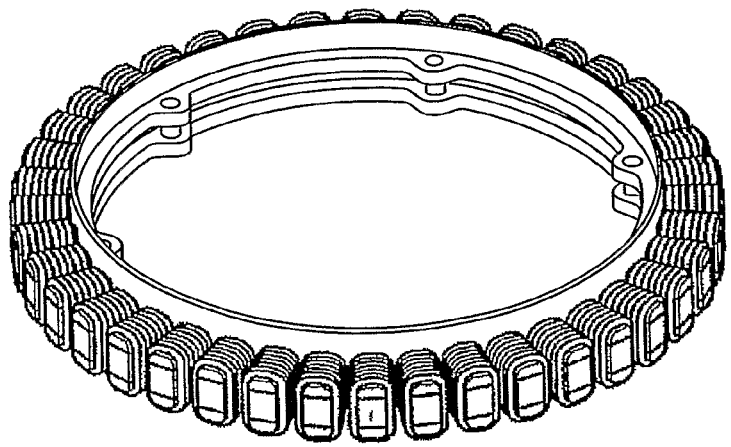
FIGS. 3d and 3e show another rotor and stator, where the rotor incorporates a magnet element according to an embodiment of the invention.
Figure 3E:
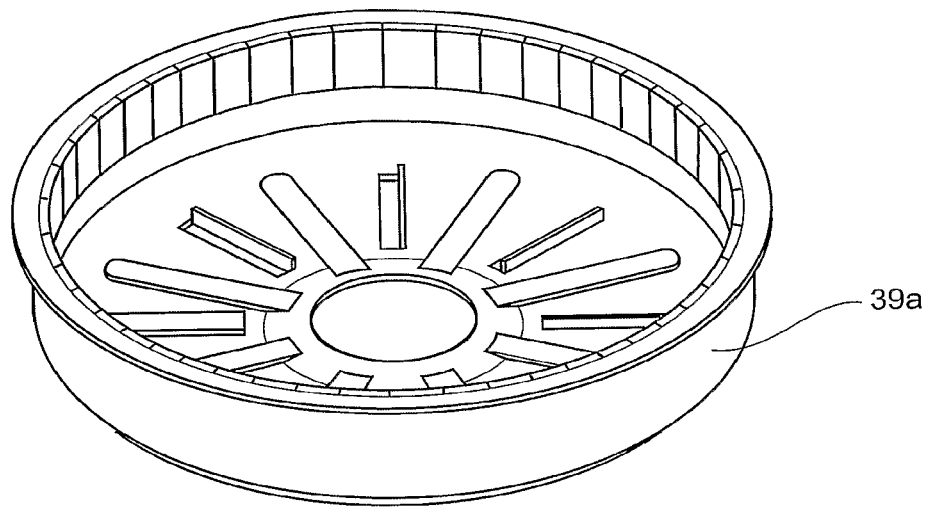

FIGS. 3a-3c show just one possibility in a general form for exemplary purposes. FIGS. 3d-3e show an alternative possible rotor. It should be noted that FIG. 3a-3c shows a magnet to stator ratio of 4:3. Other ratios are possible also, for example 6:7, 9:10 or any other suitable ratio. It should also be noted that the number of stators and magnets shown in FIGS. 3d and 3e are illustrative only to demonstrate the physical nature of the rotor/stator. The actual number of stator poles and magnets might be different. The rotor 36 can be magnetised to produce a Halbach-style resulting magnetic flux field the same or similar to that produced by a standard Halbach array.

Figure 4A:
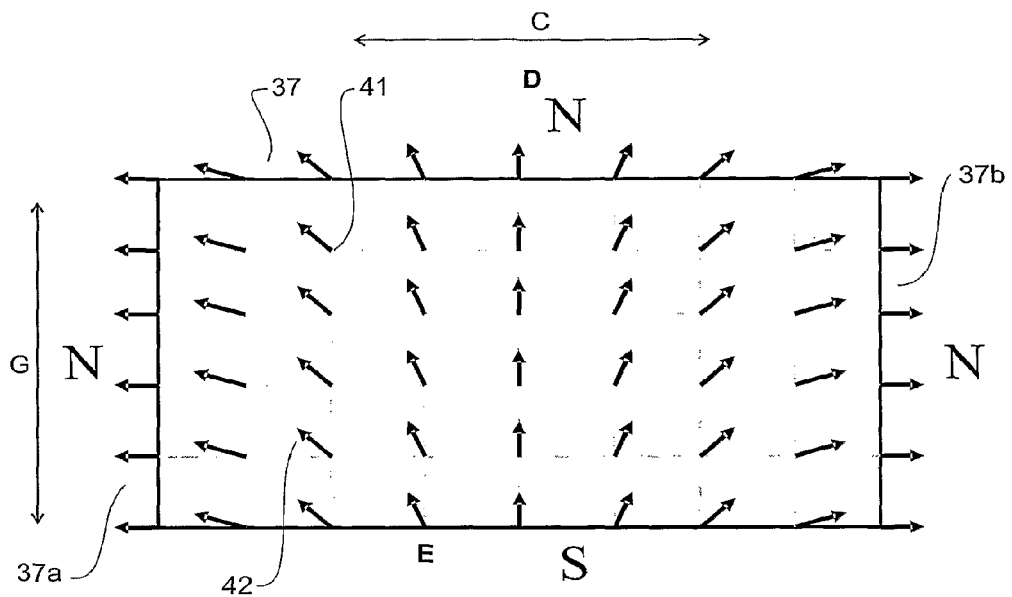
FIG. 4a shows a magnetic domain alignment pattern formed in a magnet element according to an embodiment of the invention.
Figure 4B:
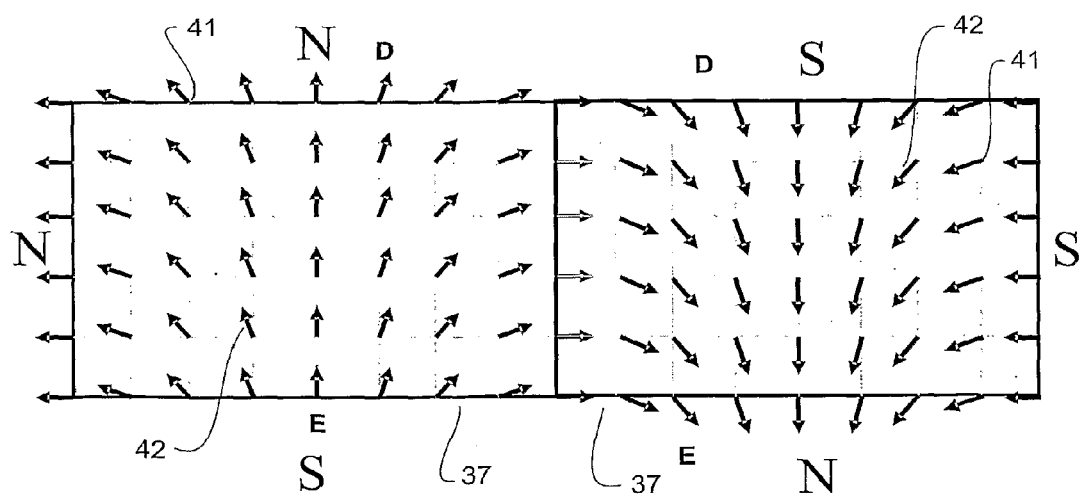
FIG. 4b shows a magnetic domain alignment pattern formed in a pair of magnet elements according to one embodiment.

Each permanent magnet element 37 in the rotor is produced in a manner such that it comprises magnetic domains, e.g. 41, pre-aligned into a magnetic domain alignment pattern 42 as shown generally in FIG. 4a. The term "magnetic domain alignment pattern" refers to the orientation of the magnetic domains 41 occurring as a result of the manufacture process. Multiple magnet elements 37 can be arranged together, such as shown in FIG. 4b, where two permanent magnet elements 37 with magnetic domains 41 pre-aligned into the domain alignment pattern 42 shown have been arranged side-by-side. This creates magnetic material with pre-aligned magnetic domains 41 that enable production of a Halbach-style resulting magnetic flux field when the magnet material is subsequently magnetised by a magnetisation pattern. A ring of such magnet elements 37 can be assembled to produce a permanent magnet ring 38 of the rotor 36. This can be magnetised to have a Halbach-style resulting magnetic flux field. This field is stronger than if isotropic or radially aligned anisotropic magnetic material is magnetised with the same flux field. A rotor 36 with Halbach-style resulting magnetic flux field is the desired field in order to produce improved operating characteristics of the motor. The magnet elements 37 of the permanent magnet ring 38 might be curved commensurate with the curvature of the rotor 36.

"Halbach style" refers to a resulting magnetic flux field that is the same as or is similar to a magnetic flux field produced by a traditional Halbach array magnet arrangement. The term "magnetisation pattern" refers to the external magnetic flux field employed to energise the magnet element according to the domain alignment pattern, causing the magnets to become magnetised. The term "resulting magnetic flux field" refers to the magnetic flux field that exists in the magnet elements 37 (and surrounding structure, where applicable) after production, assembly and magnetisation.

Figure 4C:
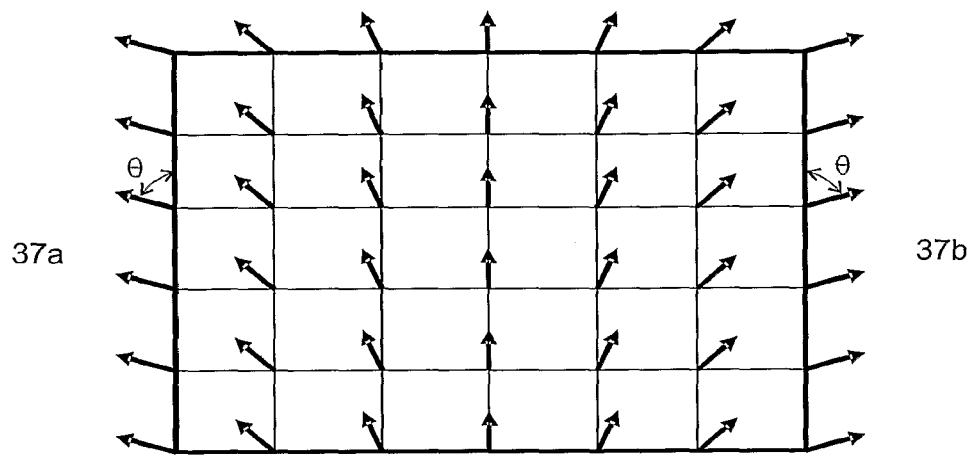
FIGS. 4c-4f show magnetic domain alignment patterns according to alternative embodiments.
Figure 4D:
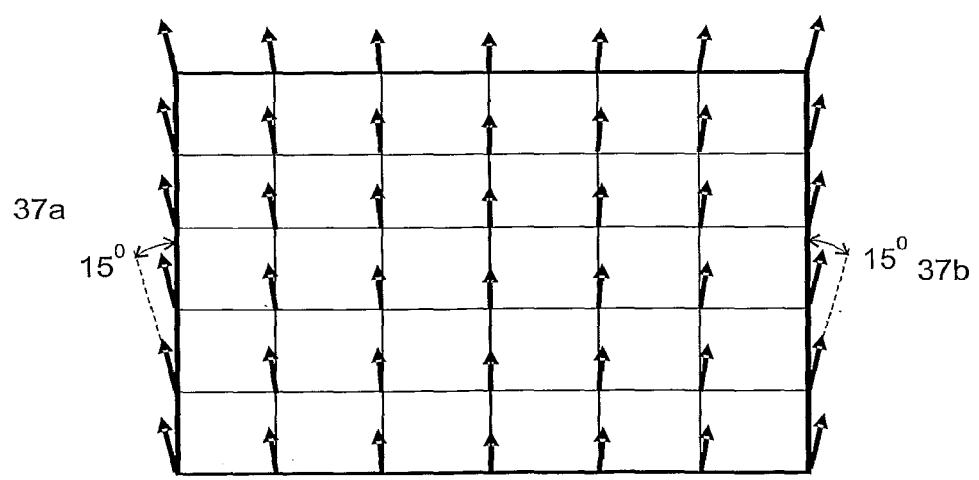
Figure 4E:
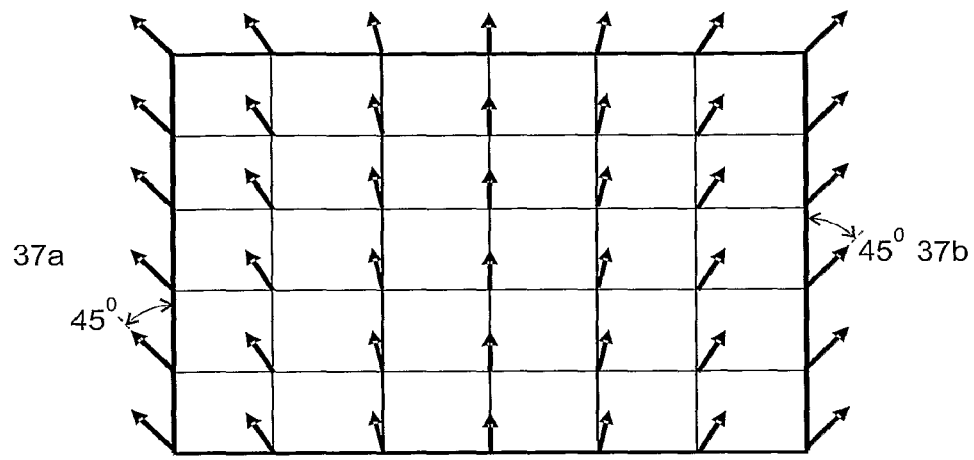

FIGS. 4c to 4e show alternative domain alignment patterns, which will be described in detail later.

Figure 5A:
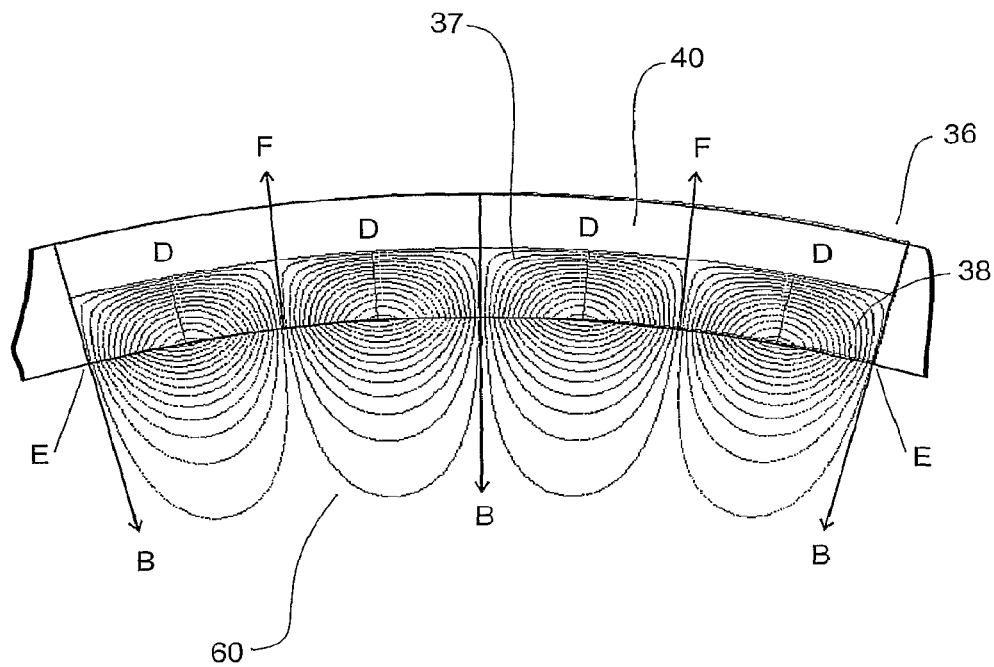
FIG. 5a shows a portion of a rotor comprising a number of magnet elements as shown in FIG. 4a, and the resulting magnetic flux field.

FIG. 5a shows the Halbach-style resulting magnetic flux field 60, in diagrammatic form, of a part of the rotor 36 of FIGS. 3a, 3b with a magnetic material ring 38 formed using the magnet elements 37 with the pre-aligned magnetic domain alignment pattern 42 as shown in FIG. 4a. This is the resulting magnetic flux field 60 when no stator 31 is present. In this case the rotor 36 has a backing ring 40. The rotor comprises magnet elements, e.g. 37, arranged side-by-side continuing the arrangement as shown in FIG. 4b. Only some of the magnetic elements 37 of the rotor are shown, but it will be appreciated that the rotor contains enough elements to form a full permanent magnet ring 38. The ring 38 has been magnetised. Once magnetised, each magnet element 37 forms a magnet that has a magnetic pole located on the stator side (E) of the magnet element 37. By arranging a number of such magnet elements 37 in a permanent magnet ring 38 as shown in FIG. 5a, a multiple pole magnet ring 38 is created where more than one magnetic pole (B or F) is located on the stator side E of the ring 38. This is done by duplicating the domain alignment pattern 42 shown in FIG. 4a but with reversed domain magnetisation directions for each subsequently added pole or element 37.

When a magnet element 37 is arranged in a ring 38 of similar magnet elements as shown in FIG. 5a, face D of the magnet element 37 (and entire ring 38) is the external (outer) face, pointing away from the rotational centre of the rotor 36. Face E of the magnet element 37 (and entire ring 38) is the internal (inner) face, pointing towards the rotational centre of the rotor. It should be noted that a magnet element 37 might have curved faces D, E commensurate with the curvature of the permanent magnet ring 38. In FIG. 4a, the faces D, E are shown flat for clarity. Poles B and F could either be north/south or south/north poles.

Figure 6A:
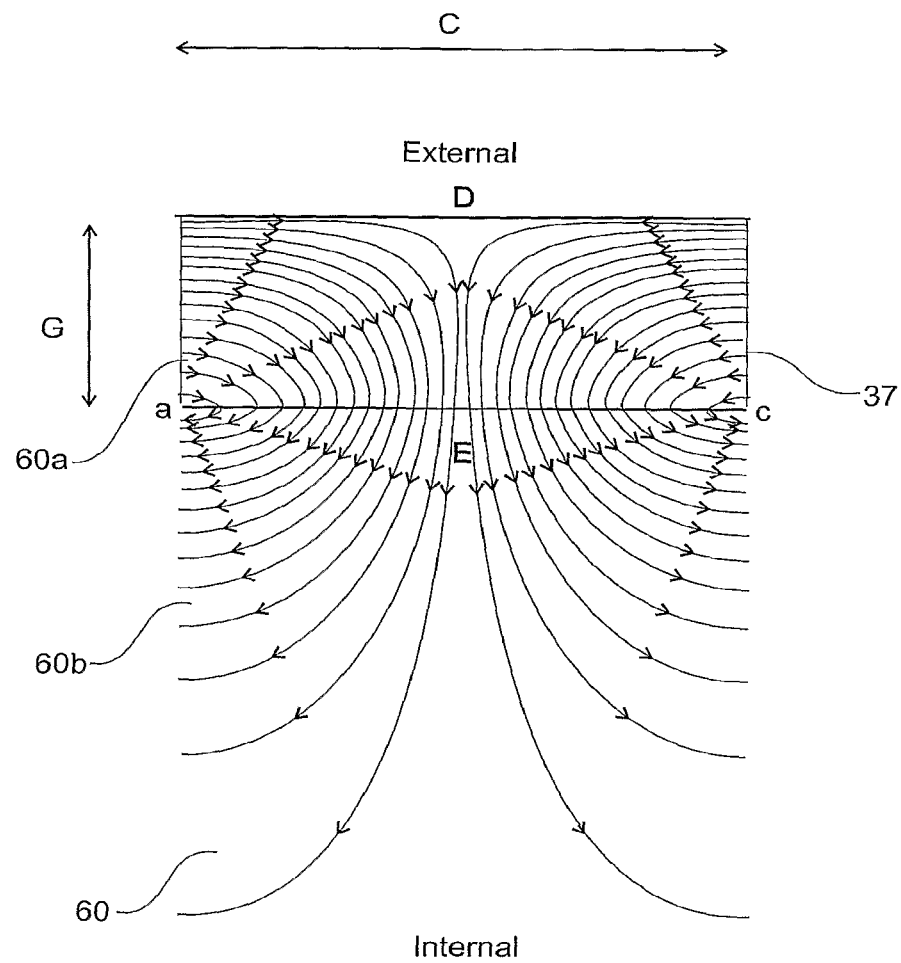
FIG. 6a shows a resulting magnetic flux field existing in a magnet element of a ring when magnetised.
Figure 6B:
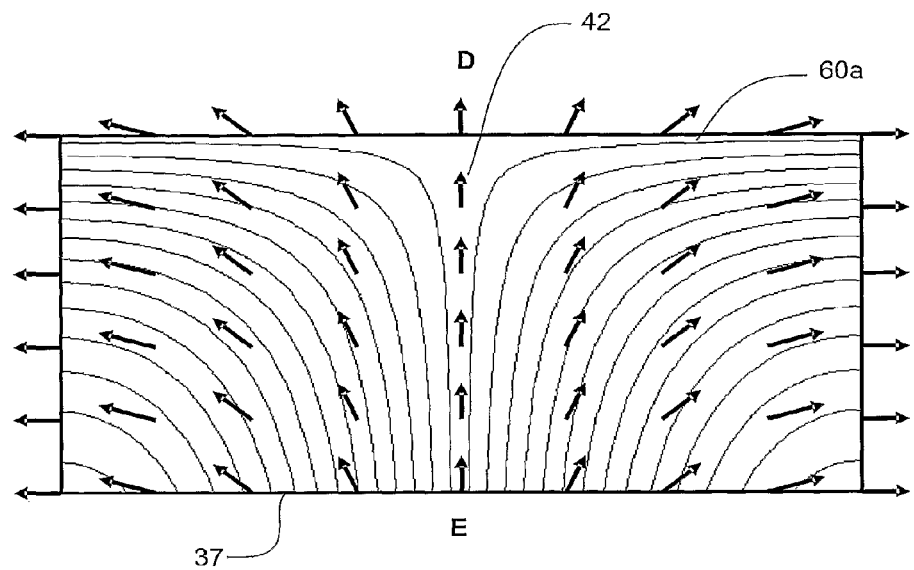
FIG. 6b shows the magnet element of FIG. 6a with its magnetic domain alignment pattern superimposed on the resulting magnetic flux field.

When a magnet element 37 forms part of a ring of such elements that has been magnetised to produce a Halbach-style resulting magnetic flux field 60, each element 37 contains a portion 60a of that resulting magnetic flux field 60. The portion of the resulting magnetic flux field is like that shown diagrammatically by the magnetic flux field (comprising flux lines or paths) in FIG. 6a. The magnetic flux 60b existing outside the element 37 is also shown for completeness. The lines represent the portion of the resulting magnetic flux field 60a in each magnet element 37 after magnetisation. The pre-aligned magnetic domains 41 of each element are generally aligned in a direction similar, but not exactly the same, as the portion of resulting magnetic flux field 60a that is ultimately created in each magnet element 37. The pre-aligned magnetic domains of each element do not need to be aligned in the same manner as the desired Halbach-style resulting magnetic flux field 60a. In fact, deviation in the magnetic domain alignment pattern (from the ideal Halbach-style resulting magnetic flux field) is possible, while still allowing or assisting the creation of the desired Halbach-style resulting magnetic flux field. This result is counter-intuitive. FIG. 6b shows a superposition of the portion of the resulting magnetic flux field 60a and the magnetic domain alignment pattern 42 existing in each element 37—this illustrates the differences between the two. When applying the magnetisation pattern to magnetise the permanent magnet ring 38 of the rotor 36, the magnetic domain alignment pattern 42 shown in FIG. 4a which exists in each magnet element 37 produces a desired Halbach-style resulting magnetic flux field that is stronger at the poles B, F on the inner face E than what would be achieved with an isotropic element or magnet elements in which the domains are aligned radially.

Referring now to FIGS. 4a to 6c in general, the nature of the magnetic domain alignment pattern 42 and resulting magnetic flux field 60 will be described in more detail. Note that these Figures show flux fields and domain alignment in diagrammatic form for illustrative purposes.

Each magnet element comprises magnetic domains 41 as noted earlier. The preferred orientation direction of each magnetic domain 41 is a function of its angular position around the circumference of the rotor 36 and does not vary with radial position, as shown in FIG. 4a. It should be noted that FIG. 4a shows the ideal preferred magnetic domain alignment pattern. In practice, not all magnetic domains will necessarily be aligned as shown, as some might vary from the ideal due to random fluctuations. Also, other patterns, as will be described later, are also possible. The differing orientations of the magnetic domains in an element 37 produces a magnetic domain alignment pattern 42 that preferably varies continuously with tangential position in direction C. Tangential position refers to the position across the width of the element 37, or more particularly across the element 37 between the lateral edges 37a, 37b. The lateral edges 37a, 37b are those edges that are adjacent or proximate other elements 37 arranged in the permanent magnet ring. The orientation of the magnetic domain alignment pattern 42 at any position corresponds to the orientation of the magnetic domain(s) 41 at that position. The magnetic domain alignment pattern 42 is substantially radially aligned in the centre of the pole B, F and substantially tangentially aligned on each edge of each magnet element 37. Radially aligned refers to the direction pointing towards or away from the centre of the permanent magnet ring 38 when the element 37 is arranged in such a ring, generally in the direction of arrow G. Tangentially aligned refers to the direction perpendicular to the lateral edge, generally in the direction of arrow C.

It will be appreciated that the magnet elements have a three-dimensional thickness, not depicted in the two-dimensional representations. It will be appreciated that the domain alignment pattern described and shown in two dimensions will exist throughout the thickness of the magnet element. If a cross section were hypothetically taken through any part of the thickness of the magnet element, substantially the same domain alignment patterns depicted would exist. Following on from this, the term "lateral edge" more generally refers to the lateral edge of the magnet element at any point throughout the thickness, such that the lateral edge in fact exists as a lateral edge surface. For simplicity, this is referred to as the lateral edge.

To produce such a magnetic domain alignment pattern 42, the radial and tangential components of the orientation of the magnetic domains 41 within each magnet element 37 are aligned according to sinusoidal functions of the tangential position along the magnet element 37, according to the following relations:

$$V_R = \cos(\theta), \text{ and} \tag{1}$$

$$V_T = \sin(\theta) \tag{2}$$

where $V_R$ and $V_T$ are the radial and tangential components of the alignment direction vector of a magnetic domain respectively and θ is the angular position across the magnet, varying from −90 degrees at lateral edge 37a to +90 degrees at lateral edge 37b.

The resulting magnetic domain alignment vector preferably rotates smoothly with the angular position across each magnet element 37, being substantially radially aligned in the centre of a magnet element (θ=0, at the pole) and being substantially tangentially aligned at the magnet element 37 edges 37a and 37b, but being of opposite polarity.

In this arrangement, the magnetic domains 41 of each magnet element 37 are aligned, prior to magnetisation, approximately in the direction of the portion of the resulting magnetic flux field 60a that exists in that magnet element 37 after magnetisation. However, they are not exactly aligned, as is evident from FIG. 6b, which shows a superposition of the domain alignment 42 and resulting magnetic flux field in the magnet element. The preferred magnetic domain alignment pattern 42 and the preferred Halbach-style resulting magnetic flux field 60 are different in geometry.

It will be appreciated that while the above describes the preferred magnetic domain alignment pattern 42, exact conformance to the preferred alignment pattern is not essential for producing a Halbach-style resulting magnetic flux field 60. Any magnetic domain alignment pattern 42 could be used in which the magnetic domains 41 are aligned, prior to magnetisation, approximately in the direction of the preferred magnetic domain alignment pattern that assists in producing a stronger Halbach-style resulting magnetic flux field.

In the general case, the magnetic domain alignment pattern 42 can be any pattern that improves or assists the production of a Halbach-style flux field during magnetisation. The inventors have found that aligning the domain alignment pattern in the manner described above improves the strength per unit of magnet material of the Halbach-style resulting magnetic flux field 60 ultimately linked through the stator. Counter-intuitively, this domain alignment pattern 42 is not the same as the actual resulting magnetic flux 60a in the magnet element 37, after magnetisation, as can be seen in FIG. 6b. This improvement in flux field strength per unit of magnet material provides an ultimate increase in torque provided by the motor in which the rotor is used.

However, some gains can be achieved even without using the ideal preferred domain alignment pattern shown in FIG. 4a. Non-ideal (e.g. with random fluctuations from the ideal) alignment patterns provide some gain, as well as the alternative embodiments described below, or acceptable deviations from those alternative embodiments, which will be appreciated by those skilled in the art.

For example, more generally, the orientation of the magnetic domain alignment pattern 42 might not be substantially radial at the poles B, F and might not be substantially tangential at the edges of the element 37. The orientation might, instead, have a predominant radial component and at least some tangential component at the poles and edges respectively. By predominant radial component, it is meant that the magnitude of the radial component dominates the orientation vector such that the vector points more in a radial direction than a tangential direction. This means that the orientation points predominantly, although not necessarily entirely, in the radial direction. Predominant radial component also covers the preferred case where there is only a radial component of the orientation vector, such that the orientation vector points solely or substantially in a radial direction.

By at least some tangential component, it is meant that the orientation vector has at least some tangential component so that the orientation vector points at least partially in a tangential direction. This can also cover where the orientation vector points completely tangentially.

Figure 6C:
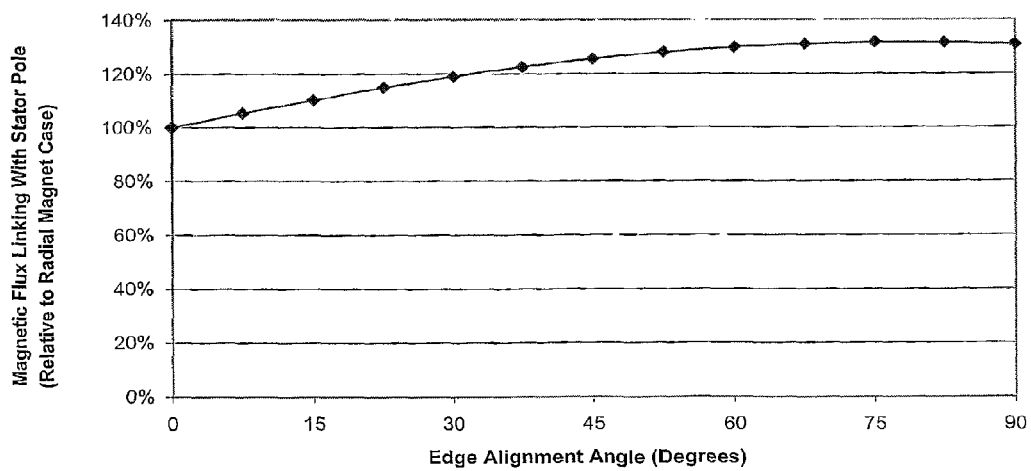
FIG. 6c shows a graph indicating the relationship between the flux linkage and orientation of the magnetic flux field at the edge of a magnet element.

The more tangential the angle of the orientation vector at the edge, the larger the increase in flux linkage through the stator, and the greater the benefits. The orientation angle is measured between the radially aligned edge 37a, 37b of the magnet element 37 and the orientation vector (see, for example θ in FIG. 4c). For example, FIG. 6c shows the relationship between a) the angle of the orientation of the domain alignment pattern 42 at the edge 37a, 37b of a magnet element 37 and b) the percentage of magnetic flux linking with the stator pole (relative to a magnet element with radially aligned domains) when the magnet element 37 is used in a rotor. As can be seen, where the orientation angle at the magnet element 37 edge is 0 degrees (i.e. the orientation at the edge is radially aligned), the percentage of flux linking is the same (100%) as for a magnet element with radial domain alignment. Where the orientation at the magnet element 37 edge is 90 degrees (completely tangential), the percentage flux linking compared with the radially aligned element is 130%. Noticeably, there is gain at even relatively small angles. For example, an orientation angle of 15 degrees at the edge 37a, 37b still gives a flux linking of around 105%, and there is a significant advantage at 30 degrees. Therefore, any suitable angle of domain alignment orientation 42 at the edge 37a, 37b could be used, as shown generally in FIG. 4c.

More specifically, referring to FIG. 4d, a domain alignment orientation at the edge (also called a "magnetic domain edge angle") 37a, 37b of around 15 degrees could be used. This is provided a vector with at least some tangential component. In a more preferable case, the orientation vector at the edge has a significant tangential component. By this it means that the orientation vector has an angle of at least 30 degrees with respect to the respective edge 37a, 37b. In a yet more preferable case, the orientation vector at the edge 37a, 37b has a predominant tangential component. By this it means that the tangential component dominates the orientation vector such that the vector points more in a tangential direction than in a radial direction. By this it means that the orientation of the magnetic domain alignment pattern at the edges could have components that are sufficient in magnitude to produce an orientation that differs by up to 45 degrees (or greater—towards 90 degrees) from the radial direction, which can be seen in FIG. 4e.

Figure 4F:
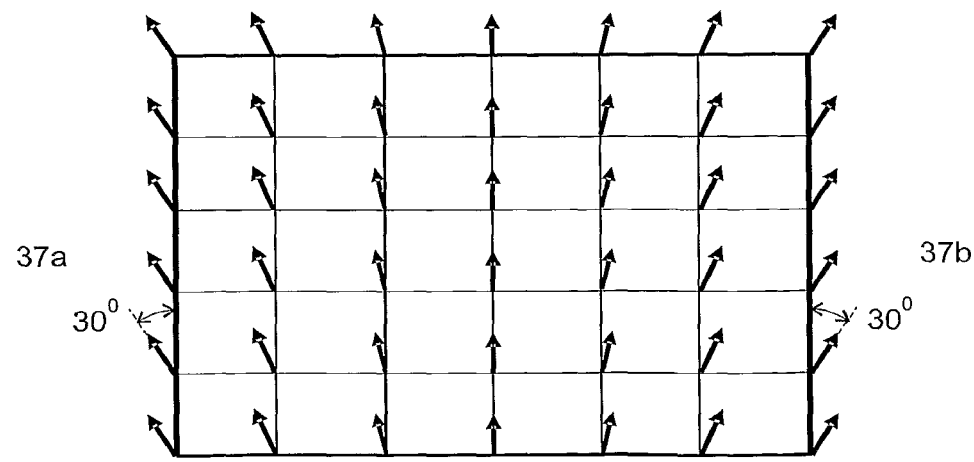

A preferred magnetic domain edge angle is 30 degrees, as shown in FIG. 4f. As edge angles increase, it has been found that the yield of the magnet elements during production decreases. It has been found that a 30 degree magnetic domain edge angle provides an acceptable yield, while still providing the required flux linking. Clearly, other edge angles might be found to be more suitable in different applications, where there are different acceptable levels of yield and flux linkage.

This means that the orientation points predominantly, although not necessarily entirely in the respective tangential or radial directions. The terms "predominant" and "significant" tangential component also covers the case where there is only a tangential component of the orientation vector, such that the orientation vector points solely in a tangential direction.

Therefore, in general, the domain alignment pattern of a magnet element 37 can be any where the orientation varies substantially continuously across at least part of the magnet element 37 (e.g. from a pole to an edge) from an orientation that has a predominant radial component at a pole of the magnet element to an orientation that has a least some tangential component at least one lateral edge 37a, 37b of the magnet element. Clearly, the same orientation variance might take place from the pole to the other lateral edge 37a, 37b also. FIG. 4c shows a magnet element in the general case with one possible alternative domain alignment pattern in which the edge orientations are not tangential, but rather some arbitrary angle θ with respect to the lateral edges of the element. In this case, θ is greater than 45 degrees, but it could be 45 degrees or less or even as low as 15 degrees, as described above.

Further, the variance across the element 37 might only be quasi-sinusoidal. Also, the variance of orientation might only be predominantly continuous, due to random fluctuations in magnetic domain orientations.

It should also be noted that FIGS. 4a and 4c to 4e show the magnetic domains aligned in a manner pointing "away" from the front face E. The magnetic domains could be aligned with the domains pointing "towards" the front face E, like the right hand element in FIG. 4b. As can be seen, the "flipped" magnetic domain direction is due to the existence of a north or south pole at face E, as shown in FIG. 4b. Predominantly, the magnetic domains are shown in respect of one pole for clarity reasons.

The magnetic domains of each magnet element are pre-aligned as described above and as shown in FIGS. 4a-4e by applying an external magnetic field during production of the magnet element 37. The pre-aligning of the magnetic domains creates an anisotropic element. Pre-aligning the magnetic domains enables more efficient creation of a permanent magnetic field in the element. Creation of the magnet element 37 is described further later with respect to FIGS. 7a to 8c.

The resulting magnetic flux field 60 will now be described in further detail. The rotor 36 has a preferred resulting magnetic flux field as shown in solid lines in FIG. 6a, which is the Halbach-style resulting magnetic flux field as mentioned previously. Each magnet element 37 in the rotor 36 has a magnetic pole with a polarity as shown by arrow "B" or "F", in FIG. 5a. The pole is radially aligned. That is, the pole creates a resulting magnetic flux field in its vicinity that is aligned substantially radially towards or away (direction of arrow G) from the centre of the rotor 36 when the magnet element 37 is arranged in a permanent magnet ring 38 with other magnet elements 37. When arranged in a ring 38, each magnet element 37 will have a pole in the same place but with an opposite polarity to adjacent magnet elements 37, as shown by the arrows "B" and "F" in FIG. 5a. Therefore, the permanent magnet ring formed from the magnet elements 37 will have poles with alternating polarity spaced around the ring.

The portion of the resulting magnetic flux field 60a in a magnet element 37 traverses from its pole (B or F) to the respective adjacent opposite poles (F or B) in each adjacent element. That is, in the preferred embodiment, the portion of the resulting magnetic flux field 60a in a magnet element 37 is aligned substantially tangential to faces D and E at the edges of the magnet element 37, as shown in FIG. 6a. At the poles B, F (FIG. 5a), the resulting magnetic flux field 60 is substantially aligned radially towards or away from the centre of the rotor 36. Therefore, in each element, the alignment of the resulting magnetic flux field 60a changes from substantially radially aligned to substantially tangentially aligned along the tangential direction, from the pole to the edges, 37a and 37b, shown by arrow "C" in FIG. 6a.

Figure 5B:
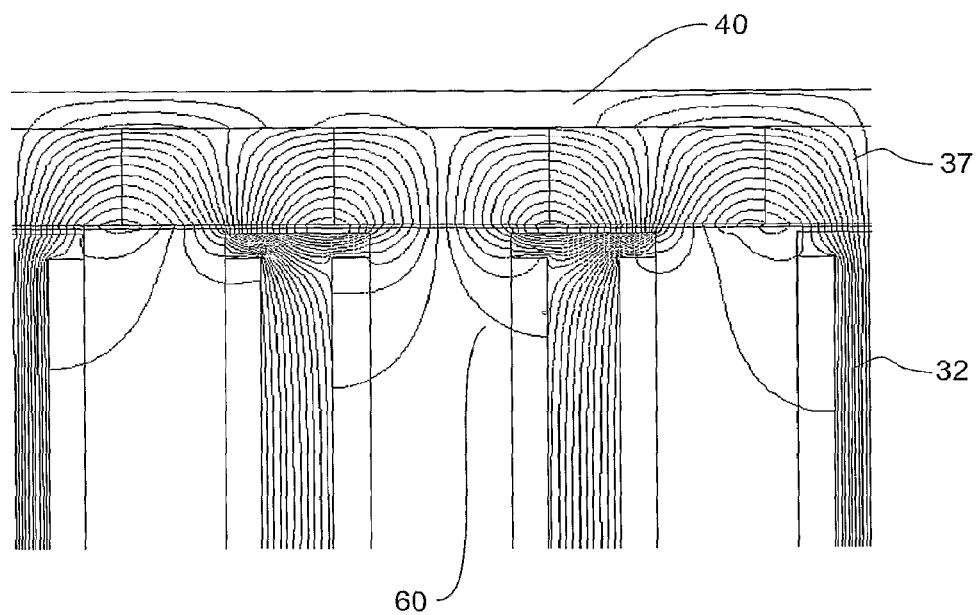
FIG. 5b shows a predicted resulting magnetic flux field of the portion of the rotor with a stator present.

The resulting magnetic flux field 60 produced in and around the magnetised permanent magnet ring 38 is substantially or at least partially constrained within the boundary defined by outer faces D of the magnet elements 37 forming the ring. However, the resulting magnetic flux field is not necessarily totally constrained, as some might enter the backing ring 40 (e.g. see FIG. 5b). Therefore, the resulting magnetic flux field 60 is significantly reduced on the external side (outer face D) of the ring 38 (and the backing ring 40, if one exists). The predominant part of the resulting magnetic flux field 60 traversing the poles B, F of opposite polarity in the permanent magnet ring 38 exist within the permanent magnet ring 38 and extend beyond the boundary defined by inner faces E towards the stator poles 32 in a radial direction. That is, the resulting magnetic flux field 60 extends beyond inner faces E and can couple with the magnetic flux field of the stator poles 32 (see FIG. 5b). The predicted actual resulting magnetic flux field 60 in the elements when a stator 31 is introduced to the rotor 36, is shown in FIG. 5b. The magnetic domain alignment pattern allows for more magnetic material to be utilised in creating the resulting magnetic flux field. The magnetic flux field 60 is focussed towards and into the stator 31 poles 32. This increases the magnetic flux field beyond the inner faces E of magnet elements 37 of the ring 38 to increase the torque on the rotor 36 and, if this field is sinusoidal, can also minimise cogging. This resulting magnetic flux field 60 is effectively created by focussing the flux in the magnet elements 37 themselves, and outside the magnet elements radially towards the stator poles 32. This focussing reduces the amount of magnetic flux passing out the external side D of the magnet ring 38. As can be seen, only a small portion of the magnetic flux field 60 passes out the back face D and into the backing ring 40. The pre-alignment of the magnetic domains 41 as described above produces the desired resulting magnetic flux field 60 when magnetisation of the rotor ring 38 or elements 37 of the rotor ring 38 takes place.

The above description of the resulting magnetic flux field 60 relates to the preferred Halbach-style resulting magnetic flux field that is to be achieved using the magnetic domain alignment pattern 42 described above. This preferred flux field mimics as much as possible a flux field produced by a large or infinite number of magnet elements formed into a Halbach array of magnets. The magnet elements 37 are oriented in the rotor according to their pole orientation order to obtain this flux "focussing" towards the centre of the rotor. This is in contrast to placing the magnet elements so that flux is "defocused" away from the centre of the rotor. In practice, this preferred flux field might not be fully achieved by the magnetic domain alignment pattern 42. In the more general case, the resulting magnetic flux field 60 can be described as follows.

Referring to FIG. 6a, each portion of the resulting magnetic flux field 60a that exists in each magnet element 37 has an orientation that varies continuously over the magnet element. The orientation of the resulting magnetic flux field 60 at any point can be described as a vector with a tangential component (as shown by arrow C in FIG. 6a) and a radial component (as shown by arrow G in FIG. 6a). Across the width of a magnet element 37, that orientation varies from an orientation that has a predominant radial component at the pole (B or F) to an orientation that has a predominant tangential component at the edges of the magnet element 37 adjacent other magnet elements 37 in the permanent magnet ring 38. Further, across the depth (from face E to face D) of the magnet element 37, the orientation varies from an orientation that has a predominant radial component at an edge corresponding to the inner face E of the permanent magnet ring 38 to an orientation that has a predominant tangential component at an edge corresponding to the outer face D of the permanent magnet ring 38. The orientation typically varies non-linearly over the magnet element 37.

By predominant radial component, it is meant that the magnitude of the radial component dominates the orientation vector such that the vector points more in a radial direction than a tangential direction. Predominant radial component also covers the case where there is only a radial component of the orientation vector, such that the orientation vector points solely in a radial direction. By predominant tangential component, it is meant that the magnitude of the tangential component dominates the orientation vector such that the vector points more in a tangential direction than in a radial direction. Predominant tangential component also covers the case where there is only a tangential component of the orientation vector, such that the orientation vector points solely in a tangential direction.

Preferably, when no stator 31 is present, the radial and tangential components of the resulting magnetic flux field 60 at the inner surface E varies substantially sinusoidally proceeding along the magnet in direction C, according to the following relations:

$$V_R = \cos(\theta), \text{ and} \quad (3)$$

$$V_T = \sin(\theta) \quad (4)$$

where $V_R$ and $V_T$ are the radial and tangential components of the flux field direction vector respectively and $\theta$ is the angular position across the magnet element 37, varying from −90 degrees at one edge 37a to +90 degrees at the opposite edge 37b.

Figure 6D:
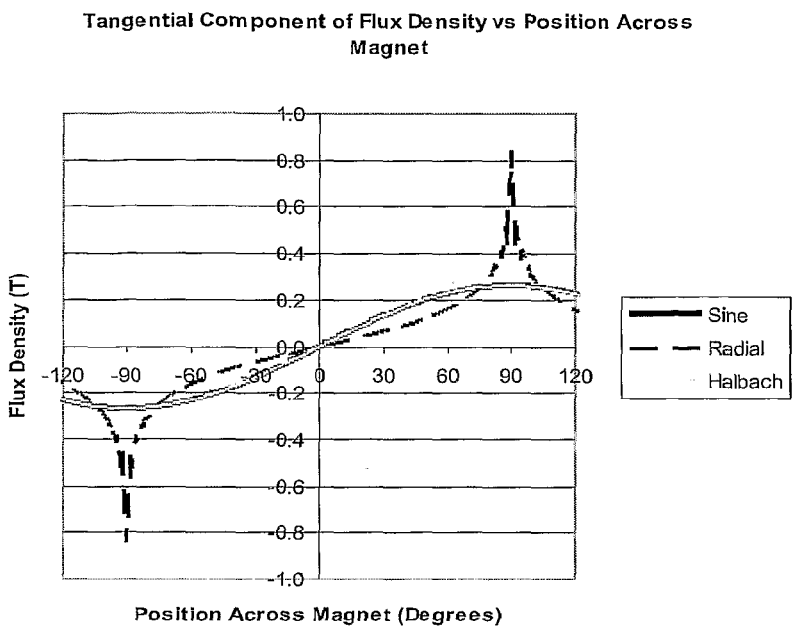
FIGS. 6d, 6e show graphs of the tangential and radial components of the resulting magnetic flux field along the inner surface of a magnet element, along with a comparison of tangential and radial components of the resulting magnetic flux field in standard elements with radially aligned magnetic domains.
Figure 6E:
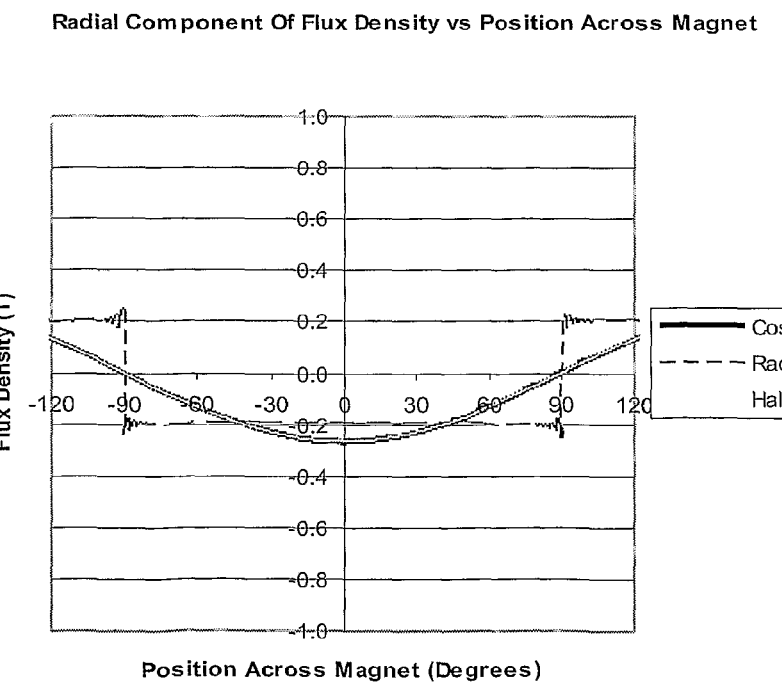

FIGS. 6d and 6e show the comparison of the tangential and radial components of the resulting flux field along the inner surface of the magnet element 37. As can be seen, they follow sine and cosine forms. The graphs in FIGS. 6d, 6e also shows a comparison to the tangential and radial components of the resulting magnetic flux field along the inner surface when using standard elements with radially aligned magnetic domains.

In addition, the portion of the resulting magnetic flux field 60b outside each magnet element 37 and between adjacent poles B, F extending beyond the boundary defined by the inner face E of the permanent magnet ring 38 has an orientation that varies continuously. Again, the orientation of the resulting magnetic flux field 60 at any point outside the inner face E of each magnet element 37 can be described as a vector with a tangential component (as shown by arrow C in FIG. 6a) and a radial component (as shown by arrow G in FIG. 6a). Between the poles B, F, the orientation varies from an orientation that has a predominant radial component at the pole to an orientation that has a predominant tangential component at the mid-point between the poles. Further, extending radially inwards from the inner face E to the centre of rotation of the rotor 36, the orientation varies from an orientation that has a predominant radial component at the inner face E to an orientation that has an increasingly tangential component with distance from the inner face E. The orientation typically varies non-linearly between the poles B, F and extending beyond the inner face E.

During use, when current is applied to the stator, a net torque is generated between the rotor 36 and stator 31, causing the rotor 36 to rotate with respect to the stator 31. In addition to this net torque, the motor will also experience a rotor position dependent torque that causes the rotor 36 to rotate in the direction in which the reluctance of the magnet flux path is reduced. Likewise the rotor 36 will oppose movement in the direction that increases reluctance. This torque is commonly referred to as cogging, or reluctance, torque. Cogging torque occurs because there are variations in the reluctance as the angular position of the rotor 36 changes, and the effect of this variation in torque can lead to unwanted vibrations. The resulting magnetic flux field 60 of the present invention alleviates this to at least some extent. In the present invention, a sinusoidal flux distribution is produced by the magnet rotor ring 38 on the stator side E of the rotor 36. A sinusoidal flux distribution makes it easier to cancel cogging forces through manipulation of the stator pole 32 tip geometry since there are no higher order torque harmonics, cancellation of the fundamental frequency being required.

Figure 7A:
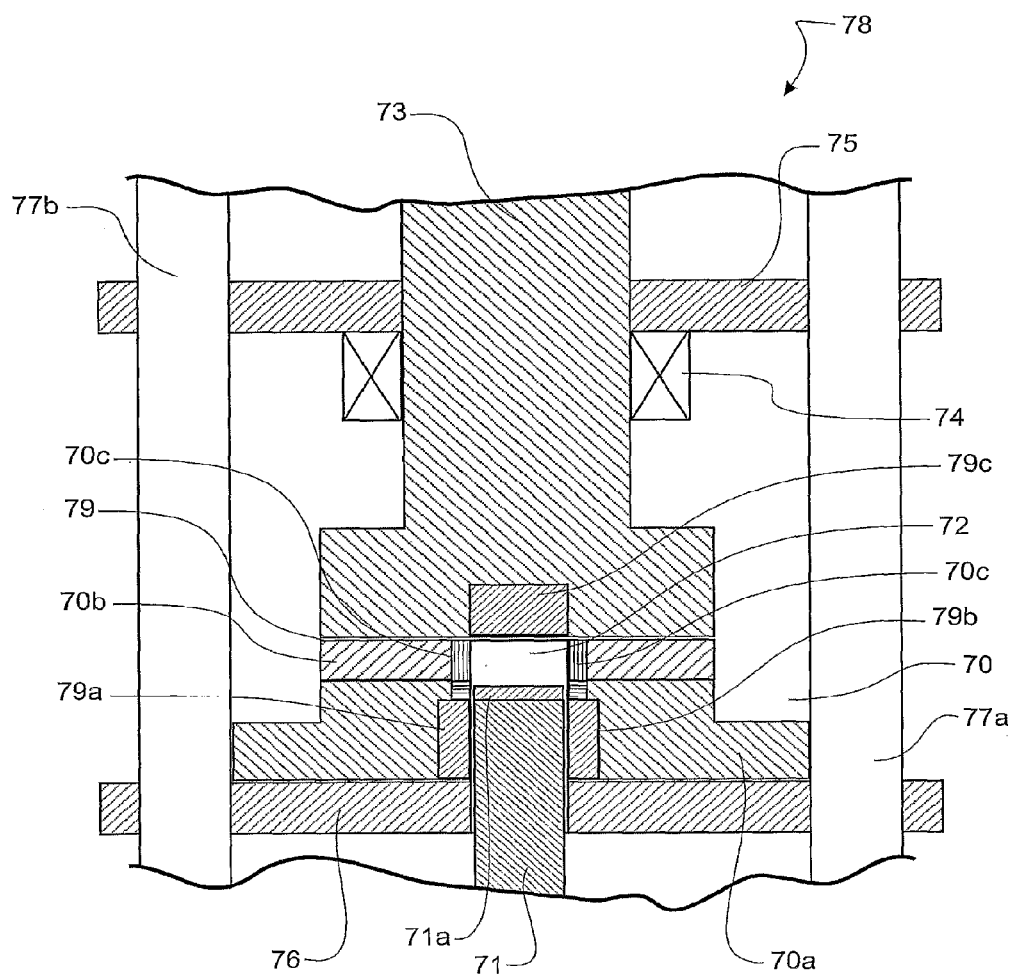
FIG. 7a shows a first apparatus for producing a magnet element with a magnetic domain alignment pattern the same as or similar to one of those shown in FIG. 4a-4e, FIGS. 7b and 7c show the magnetic domain alignment pattern during production of a magnet element using the apparatus in FIG. 7a, FIG. 8a shows a second apparatus for producing a magnet element with a magnetic domain alignment pattern the same as or similar to one of those shown in FIG. 4a-4e, FIGS. 8b and 8c show the magnetic domain alignment pattern during production of a magnet element using the apparatus in FIG. 8a, FIG. 9 shows a diagrammatic cutaway view of a washing machine of a vertical axis type that may incorporate a rotor and/or motor according to the present invention.

Each element could be produced by a press 78 as shown in FIG. 7a. The press comprises a die 70 formed of a first portion 70a made of non-magnetic steel and a second portion 70b, made of magnetic steel. The die can preferably have a tungsten carbide layer 70c to provide wear resistance. Magnetic steel inserts 79a, 79b are placed in the first portion 70a to avoid saturation in the steel of the punch during domain alignment. The die 70 defines a magnet cavity 72. The press 78 also comprises a two part lower hydraulic punch 71, and a two part upper hydraulic punch 73. The upper and lower punches 71, 73 are formed of magnetic steel. Punch 71 has a non-magnetic cap 71a. The upper punch has a non-magnetic insert 79c. Preferably, both the non-magnetic cap 71a and non-magnetic insert 79c are made of tungsten carbide for wear resistance. An electromagnetic coil 74 resides around the upper punch. A top plate 75, base plate 76 and two posts 77a, 77b provide the press structure. These are made of magnetic steel.

A possible process for promoting the domain alignment pattern 42 within a magnet using a wet slurry of ferrite material is as follows. The press 78 is set to the open position. In such a state the upper punch 73 is moved up some distance away from die 70 providing access to the magnet cavity 72. The lower punch 71 retracts downwards a short distance. A wet slurry of magnetic material (not shown) such as that typically used in industry for the moulding of high strength ferrite magnets is placed in the magnet cavity 72. The individual magnetic domains to be aligned are defined by the very finely ground magnetic material. A permeable gauze material 79 is placed in the gap between the faces of the stationary die 70 and the upper punch 73. The upper punch 73 moves down to close the gap between the stationary die 70 and upper punch 73 face. A DC current is applied to the electromagnetic coil 74, which acts to generate a magnetic flux field in the magnetic circuit provided by the press 78 components. This is described further below in respect of FIGS. 7b, 7c. The combination of the geometry and the location of the magnetic and non-magnetic material is such that the intended magnetic domain alignment pattern is promoted within the magnet cavity.

The lower punch 71 is then extended steadily upwards, compressing the material. The applied pressure forces liquids within the material out through the permeable gauze material located between the die 70 and upper punch 73 faces. The quantity of liquid within the magnet cavity is significantly reduced during this step. When the magnetic material has been sufficiently compressed, the lower punch 71 is no longer extended but is held in position. At this stage the magnet has reached the green state. In this state the magnetic domains are aligned and are no longer free to rotate relative to each other. To ensure that both the press 78 and magnet element 37 are demagnetised to enable further processing, the constant DC current is changed to be time varying such that it is sinusoidal in nature and whose magnitude diminishes towards zero. When the peaks of the current have been reduced to zero the magnet and press 78 can be considered to be demagnetised. The element is demagnetised to avoid the possibility of the element disintegrating. The upper punch 73 is then retracted upwards and the gauze material 79 removed to leave the upper surface of the magnet exposed. The lower punch 71 is then further extended a short distance so that the green magnet is separated from the die 70 and can be removed. The green magnets are then left to dry for a period of time. The green magnets are then sintered within a kiln at high temperatures. The remaining liquid is extracted from the magnet during this stage. After cooling the magnet is ready for use or if necessary additional operations such as grinding are possible.

Figure 7B:
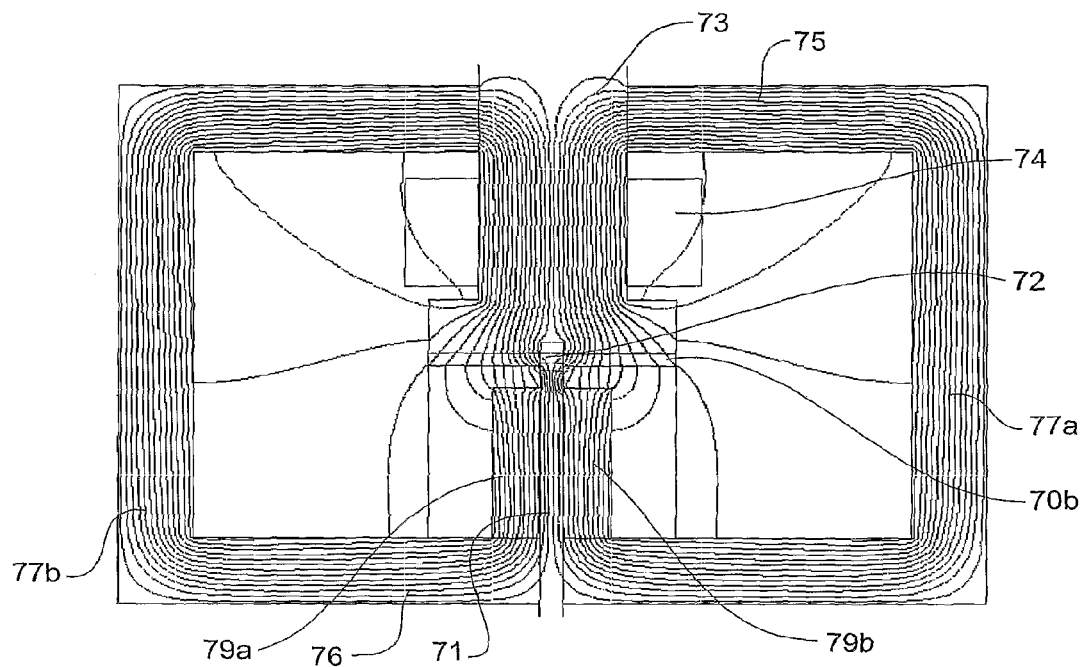
Figure 7C:
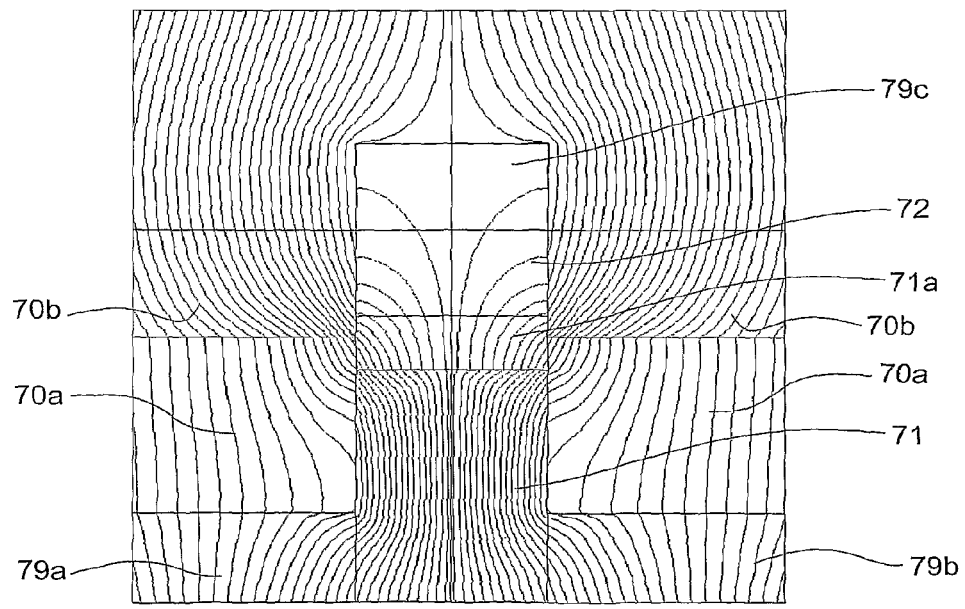

FIG. 7b shows the applied magnetic flux field to the press 78, and in particular the cavity 72 in order to align the magnetic domains of the magnet element 37 in the desired manner. FIG. 7c shows the magnetic flux field in the cavity 72 in more detail. The top plate 75, base plate 76 and posts 77a, 77b along with the insert 79a, 79b, lower punch 71, magnetic portion of die 70b and upper punch 73 combine to form a loop that directs magnetic field flux through the tool and into the cavity in such a way as to produce a resulting magnetic flux field in the cavity 72 (and magnet element 37). This flux field is generally in the same direction as the desired domain alignment pattern 42. This flux field promotes the desired alignment of the magnetic domains 41 within the magnet element. For ferrite material, a flux density throughout the magnet cavity 72 equal to the remanence flux density $B_r$ of the magnet element is typically sufficient to ensure that the magnet domains of the material are well aligned. However, a flux density less than B, could still be applied although in such a case the magnetic domains 41 may not be fully aligned with the magnetic field that exists within the cavity and therefore being less desirable but still acceptable. Though only one magnet cavity 72 is shown, for economic manufacture multiple magnet cavities 72 could be readily created within a single die 70 with the process for producing the alignment pattern within a magnet replicated for each cavity.

Figure 8A:
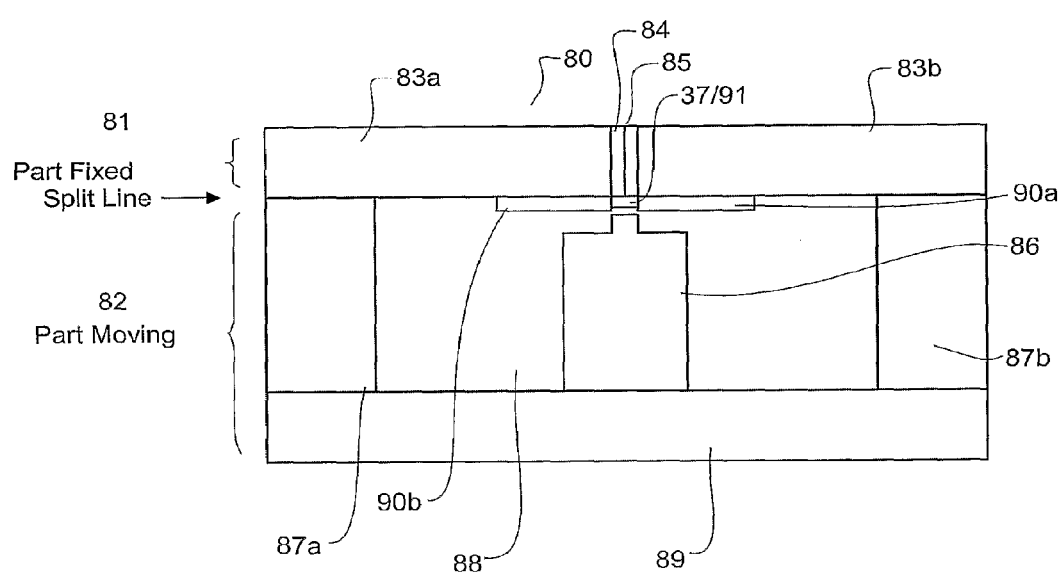

Alternatively each magnet element 37 could be produced in an injection moulding tool 80 as shown in FIG. 8a. The injection moulding tool 80 comprises two main sections 81, 82. The first section 81 is the fixed portion of the tool and the second section 82 is the moving portion of the tool. The first section comprises a fixed magnetic steel plate 83a, 83b, a fixed non-magnetic steel insert 84 and a fixed plastic injection runner 85. The second section 82 comprises a moving magnetic steel insert 86, a moving magnetic steel plate 89, moving permanent magnet material 87a, 87b, moving flux directing plates 90a, 90b and a moving non-magnetic steel 88. The first and second sections 81, 82 are arranged to form a mould cavity 91 for producing a magnet element 37. The moving permanent magnet material 87a, 87b can be Samarium cobalt permanent magnet material.

The magnetic steel plate 83a, 83b is attached to an injection moulding machine, with the injection moulding machine being capable of injection moulding blends of plastic and particles of magnetic material into the cavity 91.

Figure 8B:
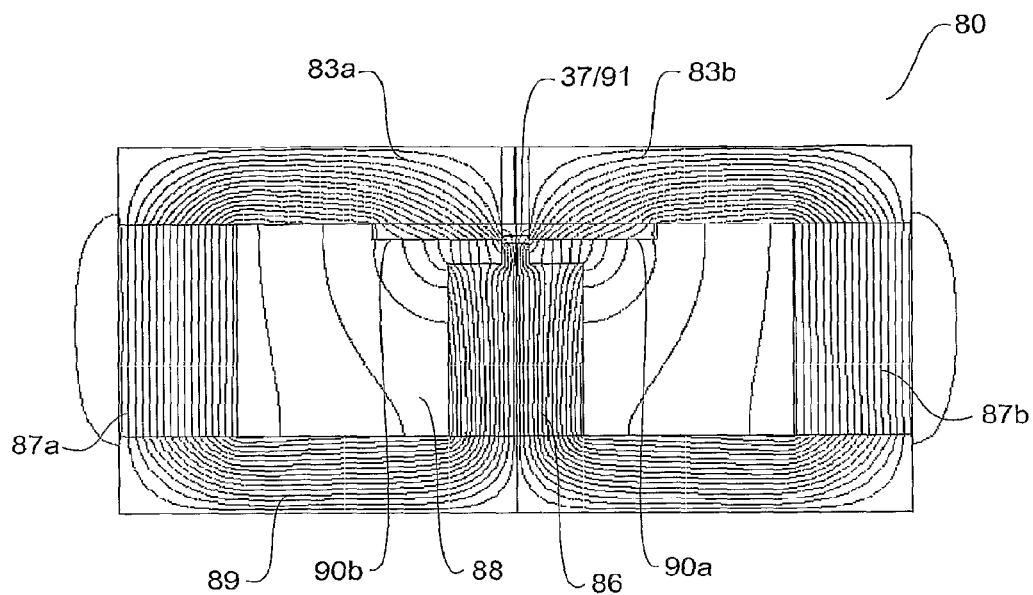
Figure 8C:
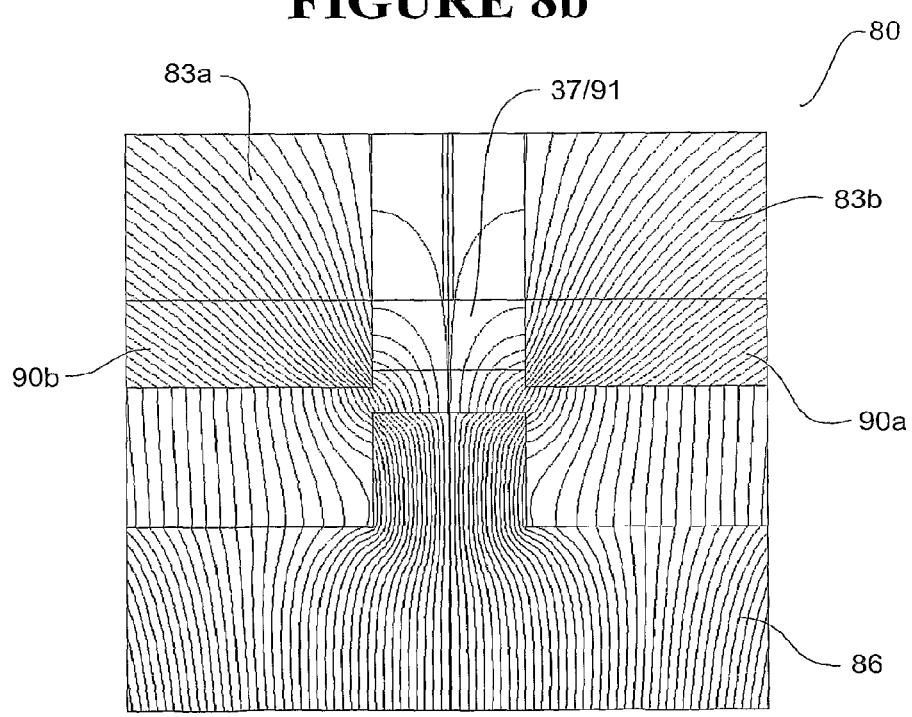

FIG. 8b show the magnetic domain alignment flux field applied to the magnetic element 37. FIG. 8c shows the cavity 91 and magnetic domain alignment flux field in more detail. This flux field is generally in the same direction as the desired domain alignment pattern 42. After producing the magnetic element 37 using the injection moulding tool 80, the magnetic element 37 is fully magnetised ready for assembly into the magnet ring 38 without the need for demagnetising for further processing. The magnet element 37 may be optionally demagnetised to enable easy assembly into the magnet ring 38 and then the assembled magnet ring 38 re-magnetised.

The magnetic steel 83a, 83b, permanent magnet material 87a, 87b, flux directing plates 90a, 90b and moving magnetic steel 86, 89 combine to form a loop that directs magnetic field flux through the tool 80 in such a way as to produce a magnetic flux field in the cavity 91 and magnetic element 37. This flux field promotes the desired alignment of the magnetic domains 41 within the plastic material with particles of magnetic material in the cavity 91. As can be seen in FIG. 8c, the magnetic flux field that is set up within the cavity 91 and magnet element 37 is such that it pre-aligns the magnetic domains 41 in the desired magnetic domain alignment pattern 42. Though only one magnet cavity 91 is shown, for economic manufacture multiple magnet cavities 91 could be readily created within a single die 80 with the process for producing the alignment pattern within a magnet replicated for each cavity.

The press shown in FIG. 7a could be used to produce ferrite magnetic elements from dry ferrite powder or wet ferrite slurry, or alternatively magnet elements from neodymium wet or dry powder or slurry. A combination of these two magnetic materials, or others could also be used in the press of FIG. 7a.

The injection moulding tool 80 of FIG. 8a could produce magnetic elements of polymer bonded ferrite, or neodymium-iron-boron, or a blend of ferrite and neodymium-iron-boron or any other polymer bonded magnetic material.

It should be noted that slurry of ferrite and/or neodymium-iron-boron material or alternatively polymer bonded ferrite and/or neodymium-iron-boron is made up of micron sized magnetic particles. The particles are this small so that they essentially contain only a single magnetic domain, which is effectively the building block of a completed magnet that looks like the diagrammatic magnet element 37 of FIGS. 4a to 4e. In an isotropic magnet element, these domains are randomly aligned. In the slurry of ferrite and/or neodymium material, the domains are free to rotate in the water, unless aligned by a magnetic field, until the water is pressed out and the particles, or domains, are "squashed" together to form a solid—then this results in an anisotropic magnetised magnet. When magnetized, the anisotropic magnet element will have a higher magnetic flux density than an equivalent isotropic magnet element.

In the injection moulding process, the domains are mixed with a polymer binder that is melted in the barrel of an injection moulder prior to injection into the cavity. The particles are relatively free to rotate in the molten polymer binder, unless aligned by a magnetic field. If the magnetic domains are aligned by a magnetic field until the binder freezes in the cavity, they are locked in place and then this again results in an anisotropic magnetised magnet.

In the case of the pressed magnet the magnet is green and is mechanically very weak. To enable the magnet to be handled after pressing and through the sintering process without disintegrating, the green magnet is demagnetised before removal from the cavity 72.

Figure 14:
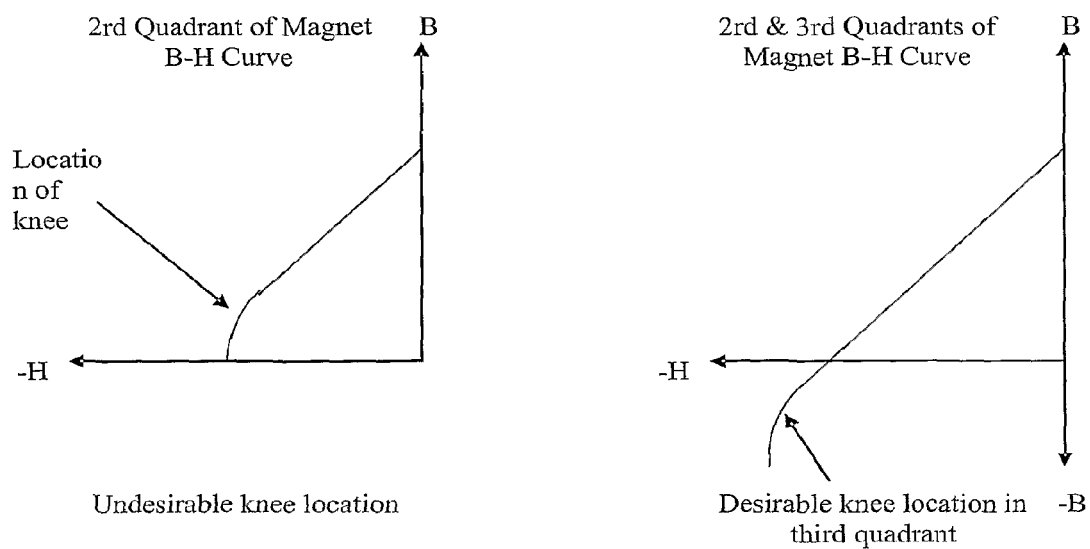
FIG. 14 shows two graphs indicating the desired B-H characteristics of a magnetic material used for a magnet element.

To prevent demagnetisation of the magnet element 37 once produced, a grade of magnetic material should be used that shows good demagnetisation characteristics. That is, preferably a grade that exhibits a B-H curve with a knee in the third quadrant, such as shown in FIG. 14.

Once the magnet elements have been produced, they can be assembled in any suitable manner to form the magnetic ring for the rotor 36 as described above. The ring can be magnetised using any suitable method, to produce the desired Halbach-style resulting magnetic flux field 60. For example, the rotor 36 could be placed on and mechanically aligned with a magnetising head. The head would be a strengthened fixture capable of high current and field. A bank of capacitors would then be discharged through the windings of the head, producing the magnetising alignment field necessary to produce the resulting magnetic flux field.

Figure 16:
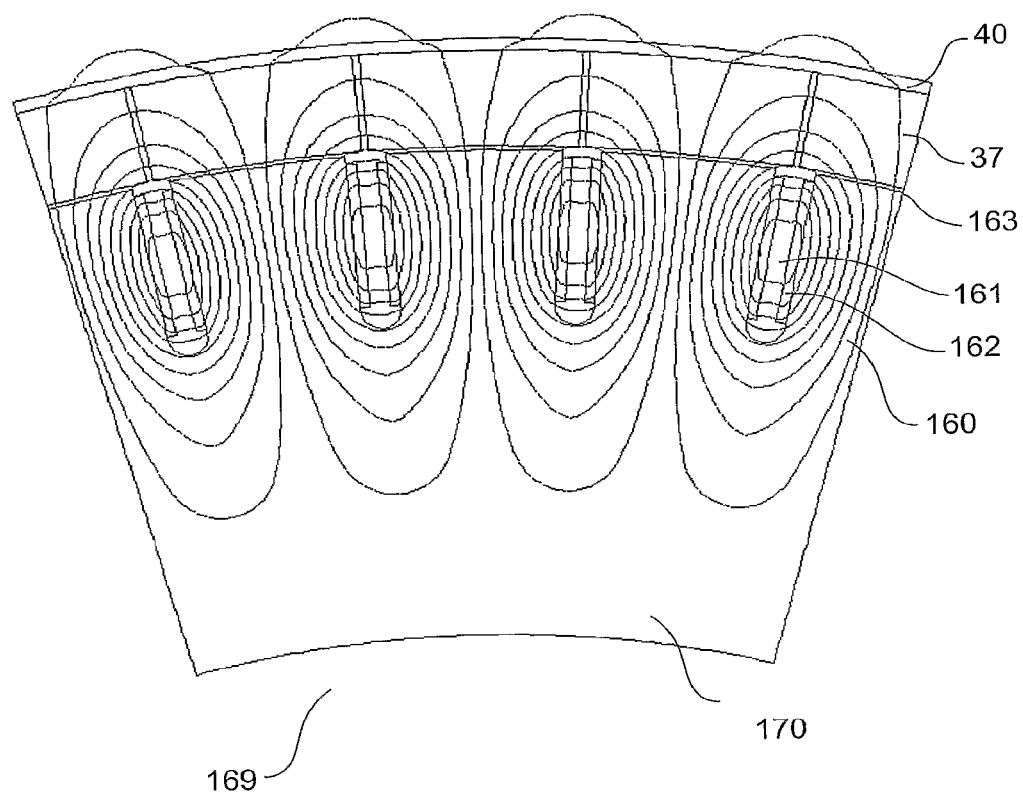
FIG. 16 shows a diagrammatic view of a magnetiser for magnetising the rotor.

FIG. 16 shows one possible magnetiser 169. This produces flux lines designed to match up with FIG. 5*a*. FIG. 16 shows an all steel back iron (laminated silicon steel) 170 with high saturation flux density 160, a set of slots between the poles 161, coil windings 162 in the slots, and air gap 163 between the magnetiser poles 161 and the magnet elements 37. A backing steel 40 is behind the magnet elements 37, and there is a small air gap 164 between the elements 37. This magnetiser 169 produces the resulting magnetic flux field in the rotor.

Magnetisation of the overall rotor is used when individual elements 37 are demagnetised during the production process to avoid disintegration. If the elements 37 are not demagnetised during production, then it is not necessary to magnetise the rotor as described above. That is, the rotor could be assembled from magnetised elements 37, such that when arranged in a ring for the rotor, the Halbach-style resulting magnetic flux field is already present. The benefits of having pre-aligned domains will still apply, in that the magnets will provide an overall stronger Halbach-style resulting magnetic flux field per unit of magnet material.

An embodiment of the invention might comprise a washing machine with a motor as described above, or another embodiment might comprise the motor itself, or the rotor itself. Alternatively, the rotor could be used in another application, such as a power generation apparatus. Another embodiment of the invention could comprise a magnet element, as described above.

Figure 9:
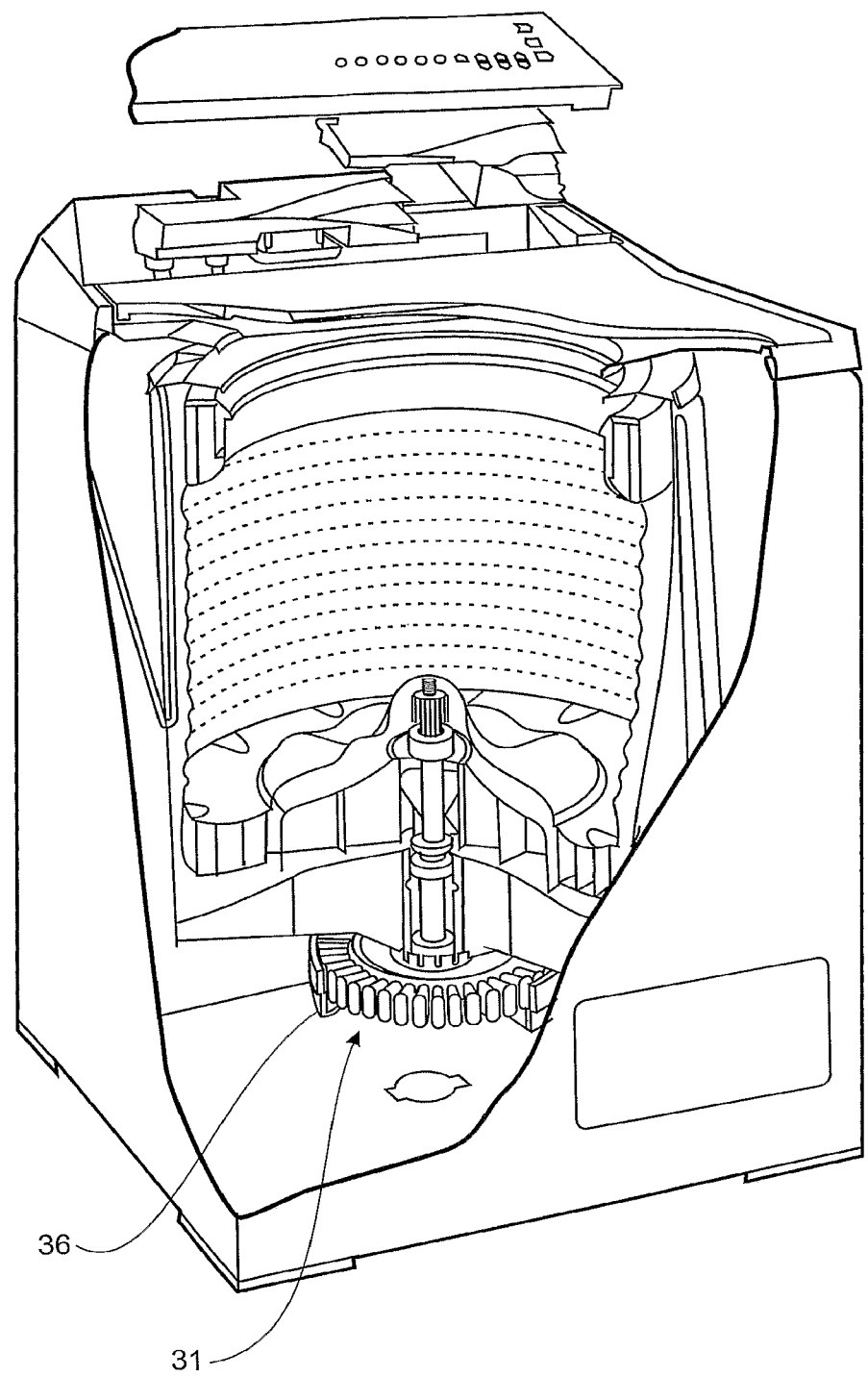

A washing machine using the motor described could take one of many forms. For example, referring to FIG. 9, one embodiment comprises a top loading washing machine with an outer wrapper and a tub suspended within the wrapper. A rotating drum with perforated walls is disposed in and rotatable within the suspended tub. A motor, comprising a stator and rotor as previously desired, is coupled to the rotating drum via a rotational shaft. The motor can be operated by a controller to spin and oscillate the rotating drum to carry out washing of clothes. The magnetic elements used in the rotor reduce cogging of the motor and the magnetic field in the rotor increases the torque of the motor relative to the rotor size, weight and volume of ferrite. These make the motor as a whole less expense and operate more efficiently.

Figure 10:
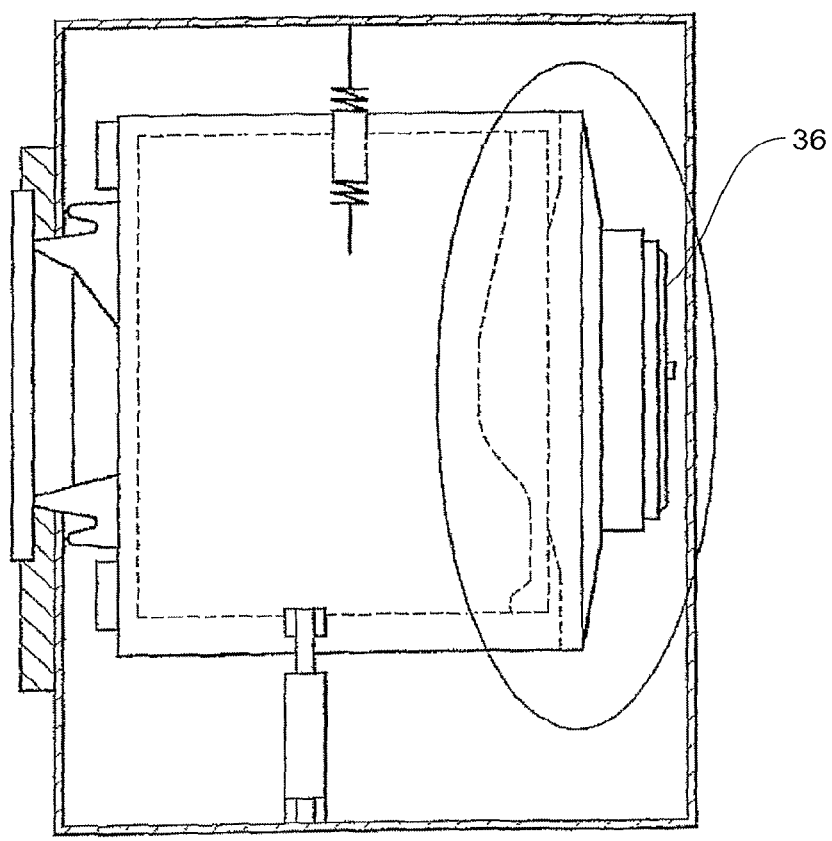
FIG. 10 shows a diagrammatic view of a horizontal axis washing machine with front access that may incorporate the rotor and/or motor according to the present invention.

Referring to FIG. 10, another embodiment comprises a front loading horizontal axis washing machine with an outer wrapper and a rotating drum housing suspended in the outer wrapper. A rotating drum is disposed in and rotatable within the rotating drum housing. A door provides access to the rotating drum for introducing or removing clothing to be washed. A gasket provides a seal between the door and the rotating drum. A motor, comprising a stator and rotor as previously desired, is coupled to the rotating drum via a rotational shaft. The motor can be operated by a controller to spin and oscillate the rotating drum to carry out washing of clothes. The magnetic elements used in the rotor reduce cogging of the motor and the magnetic field in the rotor increases the torque on the rotor. These make the motor as a whole operate more efficiently.

Figure 11:
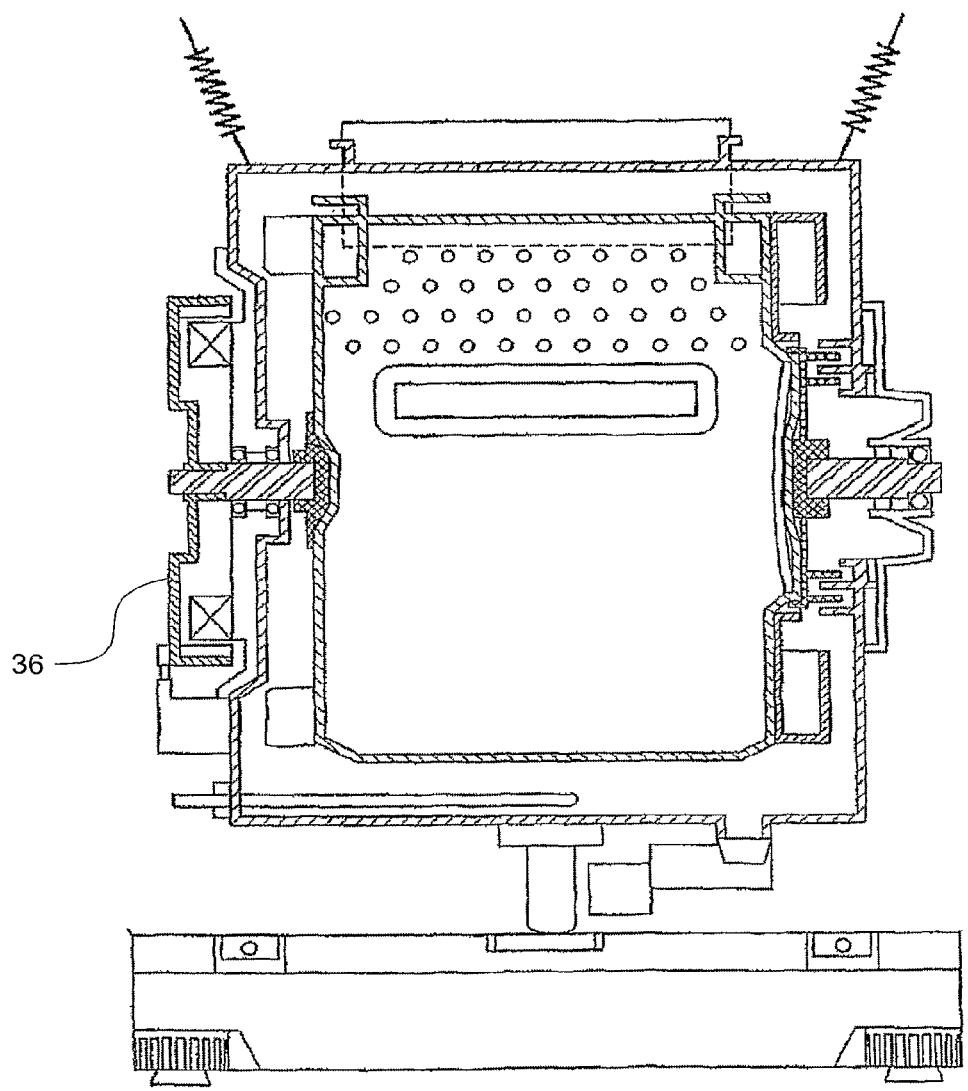
FIG. 11 shows a diagrammatic view of a horizontal axis washing machine with top or tilt access that may incorporate the rotor and/or motor according to the present invention.

Referring to FIG. 11, another embodiment comprises a top loading or tilt access horizontal axis washing machine. The washing machine has an outer wrapper and a tub suspended within the outer wrapper. A rotating drum can rotate within the tub. Clothes can be introduced and taken from the rotating drum through an opening in the top of the drum. A motor, comprising a stator and rotor as previously desired, is coupled to the rotating drum via a rotational shaft. The motor can be operated by a controller to spin and oscillate the rotating drum to carry out washing of clothes. The magnetic elements used in the rotor reduce cogging of the motor and the magnetic field in the rotor increases the torque on the rotor. These make the motor as a whole operate more efficiently.

Figure 12:
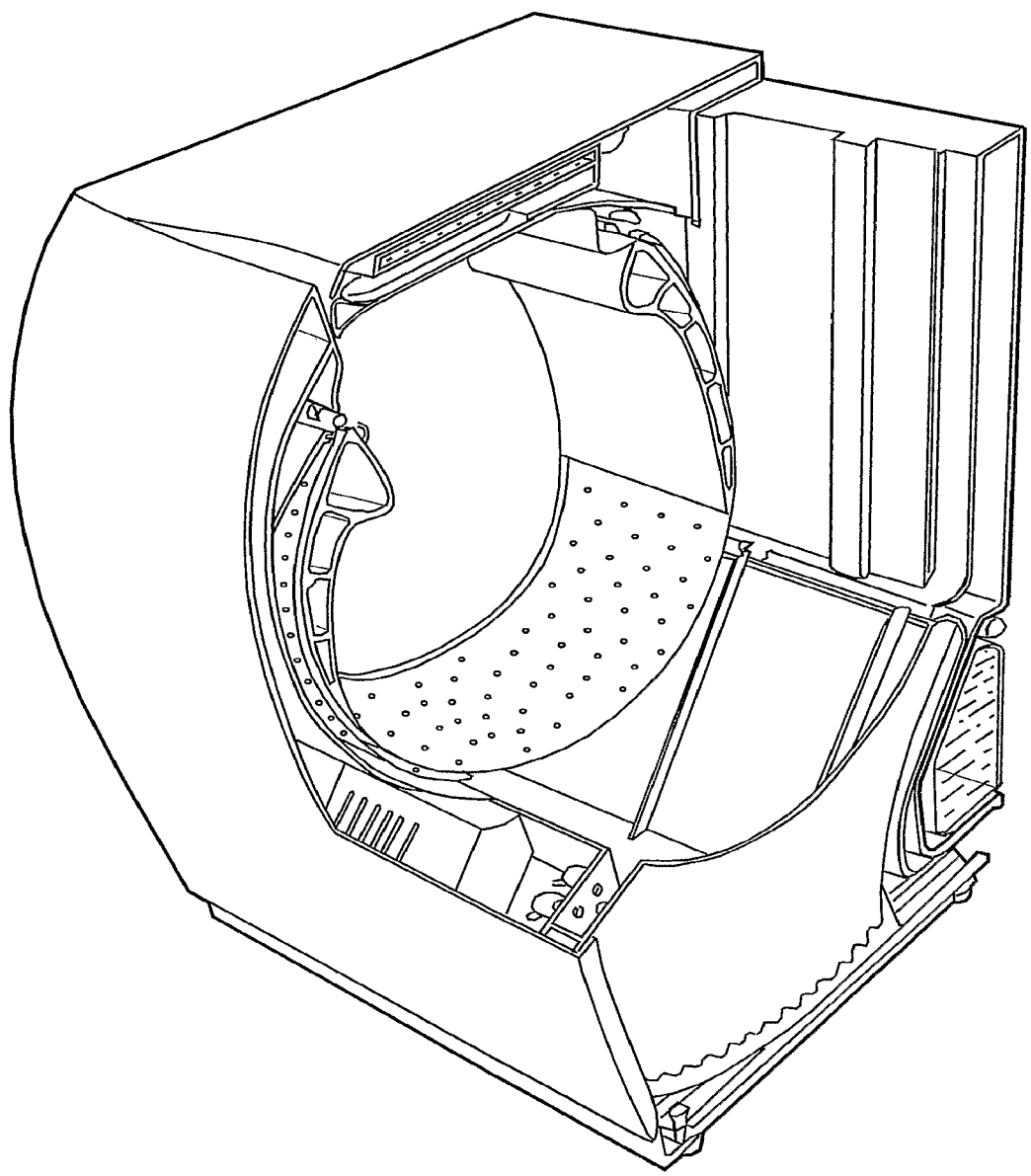
FIG. 12 shows a diagrammatic view of a horizontal axis laundry machine with tilt access that may incorporate the rotor and/or motor according to the present invention.

FIG. 12 shows a tilt loading horizontal axis washing machine. The washing machine has an outer wrapper and a tub suspended within the outer wrapper. A rotating drum can rotate within the tub. Clothes can be introduced and taken from the rotating drum by tilting the drum. A motor, comprising a stator and rotor as previously desired, is coupled to the rotating drum via a rotational shaft. The motor can be operated by a controller to spin and oscillate the rotating drum to carry out washing of clothes. The magnetic elements used in the rotor reduce cogging of the motor and the magnetic field in the rotor increases the torque on the rotor. These make the motor as a whole operate more efficiently.

It will be appreciated that FIGS. 9 to 12 show just four examples of washing machines that could utilise a motor with a rotor containing magnetic elements produced in the manner described above. Other embodiments of the present invention could comprise other washing machines be envisaged by those skilled in the art, operated by a motor as described above.

Figure 13:
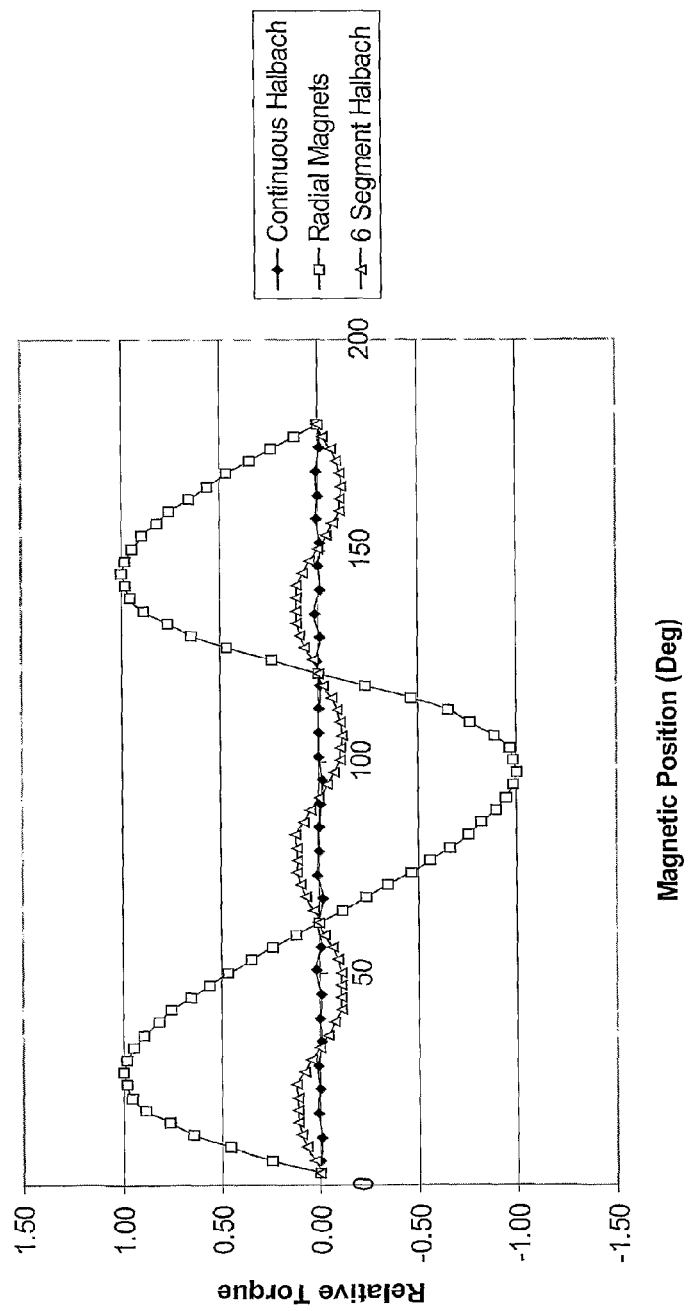
FIG. 13 shows a graph of the relative cogging performances of Halbach and standard magnetic field patterns.

FIG. 13 shows the predicted relative togging performance of a) rotors with standard magnetic field patterns and radially oriented magnetic domains, and b) rotors with equal size and volume of magnet material with magnetic domains oriented to follow the Halbach type field patterns.

It will be appreciated that magnet elements made from material other than hard ferrite are possible. For example, neodymium—iron—boron or Samarium—Cobalt or other magnet material could be used, or a combination of magnetic materials. Further, magnetic material(s) bonded into a polymer could be used.

It will be appreciated the rotor or motor according to the embodiments above could be used in another applications, such as a power generation apparatus.

Figure 15A:
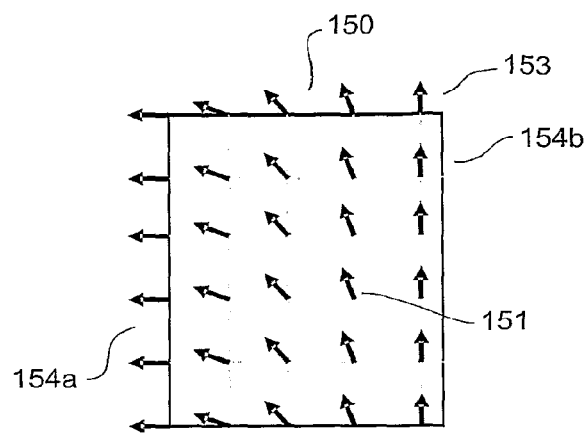
FIGS. 15a-15d show alternative magnet elements with magnetic domain alignment patterns.

It will be appreciated that the magnet element 37 described is preferred, although other configurations of magnet element with domain alignment patterns are possible, that when combined form an equivalent domain alignment pattern like that shown in FIGS. 4*a*, 4*b* or FIGS. 4*c* to 4*e*. For example, a magnet element might in fact comprise just one half of the magnet element 37 shown in FIG. 4*a*. This is shown in FIG. 15*a*. This alternative magnet element 150 has a magnetic domain alignment pattern 151 from one half of the magnet domain alignment pattern 42 shown in FIG. 4*a*. The magnetic domain alignment pattern 151 has a pole 153 at one lateral edge 154*b* of the element 150. The orientation varies substantially continuously across the magnet element 150 between its lateral edges 154*b*, 154*a* from an orientation that has a predominant radial component at the pole 153 of the magnet element at one lateral edge 154*b* to an orientation that has a least some tangential component on the other lateral edge 154*a* of the magnet element 150. It will be appreciated that the nature of the magnetic domain alignment pattern is exactly the same as one half of the alignment pattern shown in FIG. 4a, and the description there can be extended to apply to this embodiment. The alternative embodiments of domain alignment patterns described in relation to the magnet element 37 (see e.g. FIGS. 4c to 4e) can also apply to the magnet element 150. that is, in such a element as 150, its domain alignment pattern has an orientation that varies substantially continuously across the magnet element between its lateral edges from an orientation that has a predominant radial component at a pole of the magnet element at one lateral edge to an orientation that has a least some tangential component the other lateral edge of the magnet element.

Figure 15B:
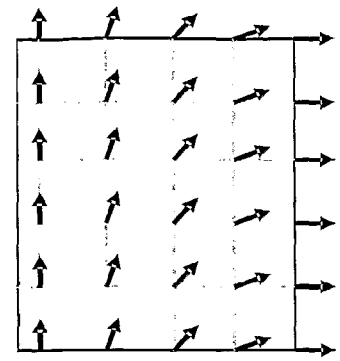

It will also be appreciated that an alternative magnet element could also be made that has a domain alignment pattern that is the minor image of that shown in FIG. 15a, as shown in FIG. 15b. Elements 150 and a mirror image element could be assembled resulting in an element like that in FIG. 4a. Alternatively, Element 150 could be assembled with another element 150 rotated 180 degrees around the radial axis, resulting in an element like that of FIG. 4a.

Figure 15C:
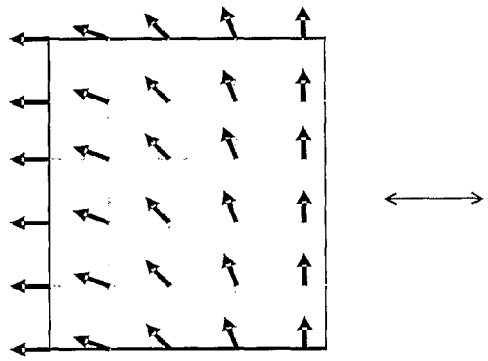
Figure 15C:
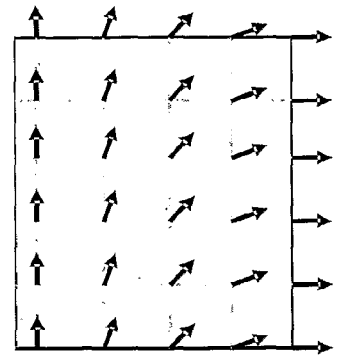
Figure 15D:
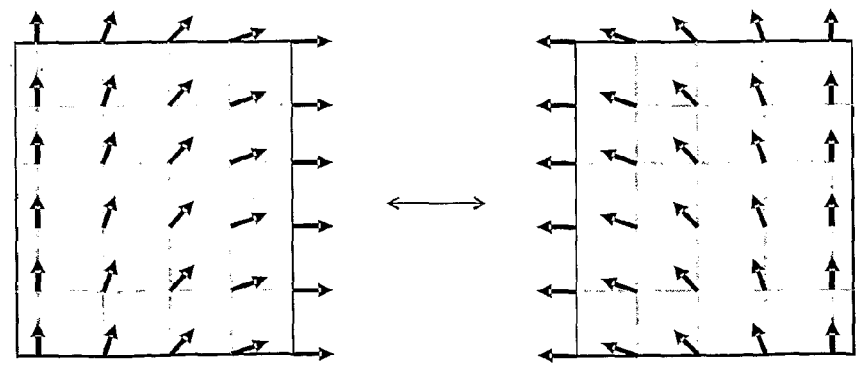

The elements 150 of FIGS. 15a, 15b could be arranged together to produce a rotor as described above. For example, as shown in FIG. 15c, two such elements could be brought together arranged side-by-side in a rotor ring, to effectively produce an element 37 like that shown in FIG. 4a. Alternatively, as shown in FIG. 15d, the position of the elements 150 could be reversed. Any such combination of elements 150 could then be arranged in a ring 38 to produce the required domain alignment pattern. The magnet elements of alternative embodiments could be made in the press 78 or injection moulder 80 described above.

Alternatively, a magnet element 37 could have poles at the edges, and tangentially aligned domains in the centre. A ring could be assembled from such elements.

Figure 3F:
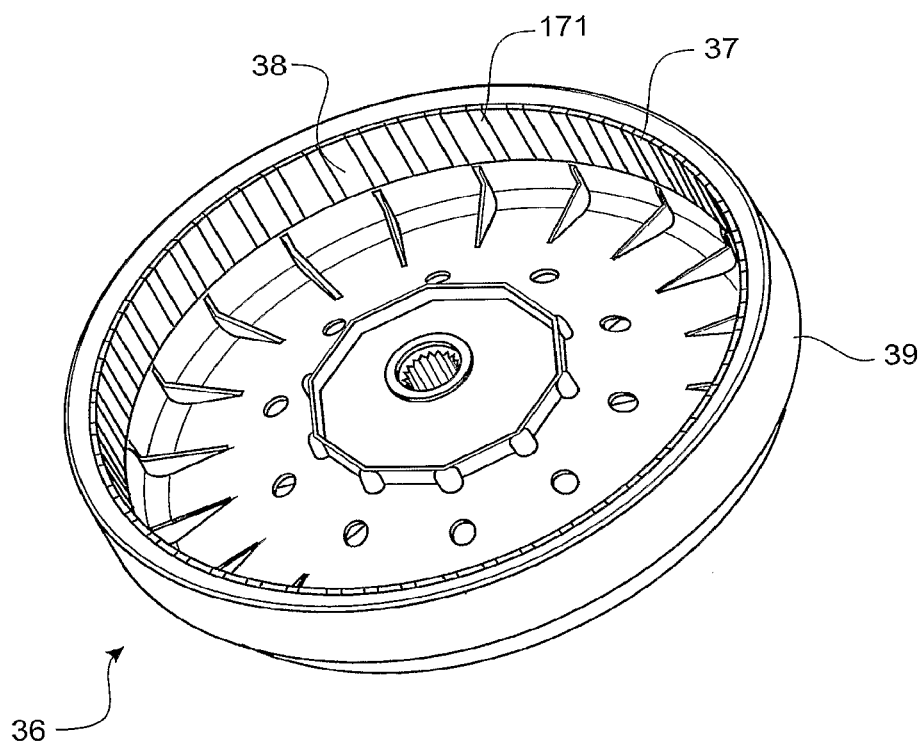
FIG. 3f shows another rotor that incorporates a magnet element according to an embodiment of the invention.

In the preferred embodiment described above, when the magnet elements 37 are arranged in a ring, they are arranged directly adjacent to each other, such that a lateral edge of one magnet elements is touching or very near the corresponding lateral edge of an adjacent magnet element 37. In an alternative embodiment as shown in FIG. 3f, there could be spacer elements e.g. 171 between the lateral edges of one or more adjacently arranged magnet elements 37. Each spacer element could be made from magnetic steel, or other magnetic material such as hard ferrite, neodymium—iron—boron or a combination, or a bonded magnetic material, or other magnetic or non-magnetic material. Where magnetic material is used, the magnetic domains could be aligned in a suitable domain alignment pattern to assist the production of a stronger Halbach-style magnetic flux field per unit magnet in the rotor overall. Such a flux field could be an anisotropic tangentially aligned domain pattern. It will be appreciated that in this specification that when referring to adjacently arranged or proximate magnetic elements 37, this does not preclude having a spacer elements between the corresponding lateral edges of such adjacently arranged or proximate magnetic elements 37.

Figure 17:
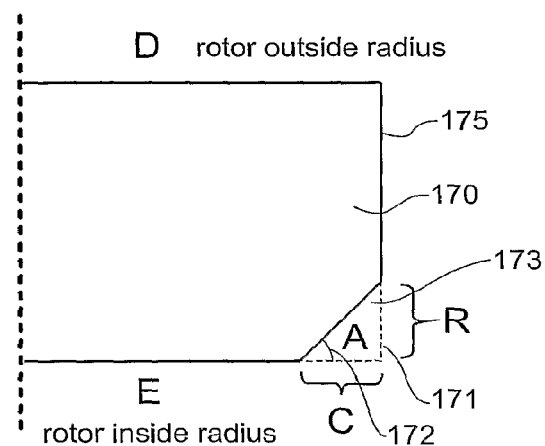
FIG. 17 shows a magnet element with a chamfer according to another embodiment.

FIG. 17 shows an alternative embodiment of a magnet element 170, which comprises a chamfer 171. The chamfer is placed on each intersection of the inner face E of the element and its lateral edge 175. Only one chamfer is shown, but a magnet element could have a chamfer on both lateral edges 175. Multiple elements 170 can be arranged in an adjacent fashion with their respective chamfers aligned. The chamfer 171 reduces cogging.

The chamfer has an angle 172, and a cross-sectional area "A" 173. The exact shape of the chamfer (in terms of chamfer size and angle) is not critical. The effect of the chamfer is approximately correlated to the cross-sectional area A 173 of the chamfer. For a given magnetic domain edge angle there are multiple chamfer sizes and angles that all provide a low cogging solution.

Possible chamfer areas for particular edge angles are as follows:

| Magnetic Domain Edge Angle | Area removed by chamfer to reduce cogging |
| --- | --- |
| 15° | 1.5 mm$^2$ |
| 30° | 1.0 mm$^2$ |
| 45° | 0.5 mm$^2$ |
| 60° | 0.05 mm$^2$ |

The above chamfer 171 dimensions are suitable for one type of rotor. It will be appreciated by those skilled in the art that the area 173 of chamfer 171 for any particular edge angle will differ depending on rotor/magnet element specifications. Those skilled in the art would be able to determine the correct area of chamfer 171 by selecting that which provides the required cogging performance.

Figure 18A:
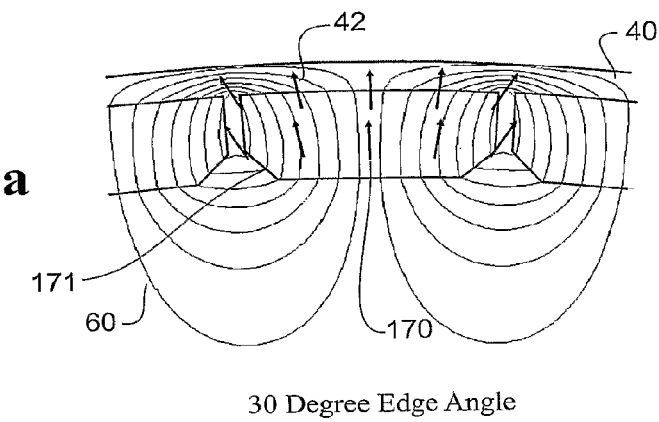
FIGS. 18a to 18c show resulting magnetic flux fields for adjacent magnet elements with chamfers and magnetic domain edge angles of 30, 60 and 90 degrees respectively.
Figure 18B:
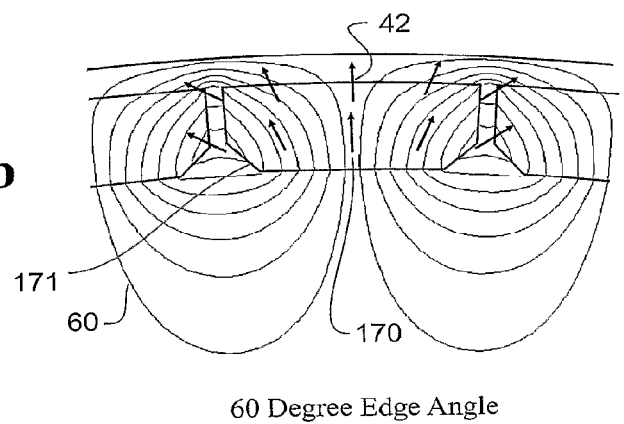
Figure 18C:
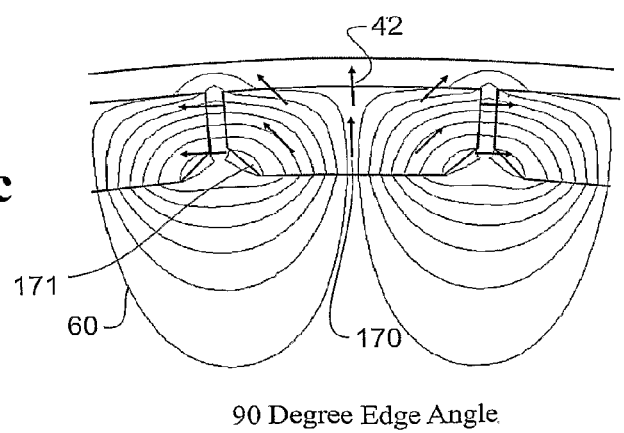

FIGS. 18a to 18c show various magnet elements 170 with chamfers 171 arranged in an adjacent manner. The Figures show adjacent magnet elements with 30°, 60 and 90° magnetic domain edge angles respectively. For completeness, the magnetic domain alignment patterns 42 and resulting magnetic flux fields 60 are shown on each.

Figure 19:
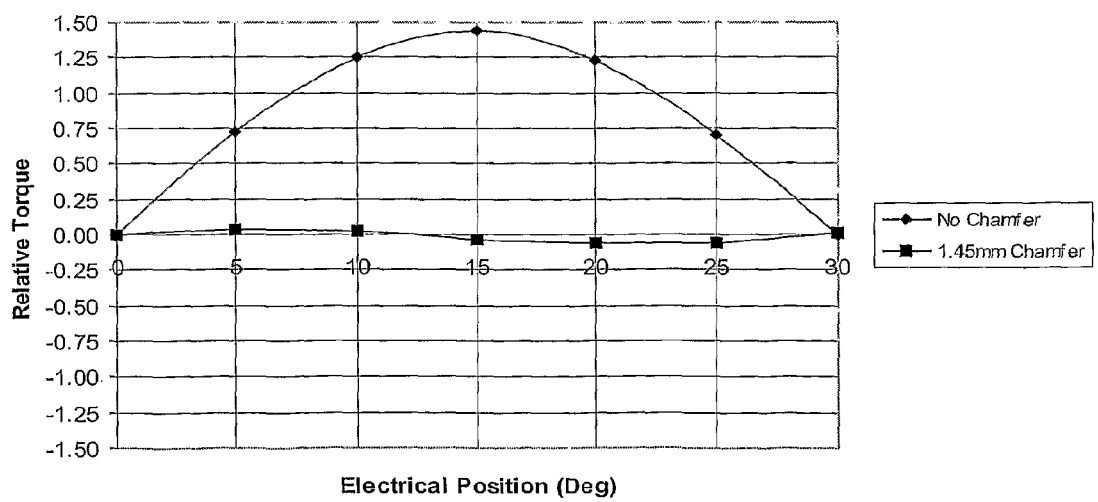
FIG. 19 shows a graph of the cogging torque for chamfered and non-chamfered magnet elements.

FIG. 19 indicates how utilising magnet elements with chamfers improves cogging performance over using magnet elements without chamfers. The graph in FIG. 19 shows the relative cogging torque produced in a rotor constructed from magnet elements with chamfers as described above, versus the relative cogging torque produced in a rotor constructed from magnet elements without chamfers. In this case, the chamfer has radial and tangential chamfer dimensions equal to 1.45 mm and each magnet element has a 30° magnet domain edge angle. The graph indicates that cogging torque is significantly reduced in the case where chamfered magnets are utilised.

Figure 20:
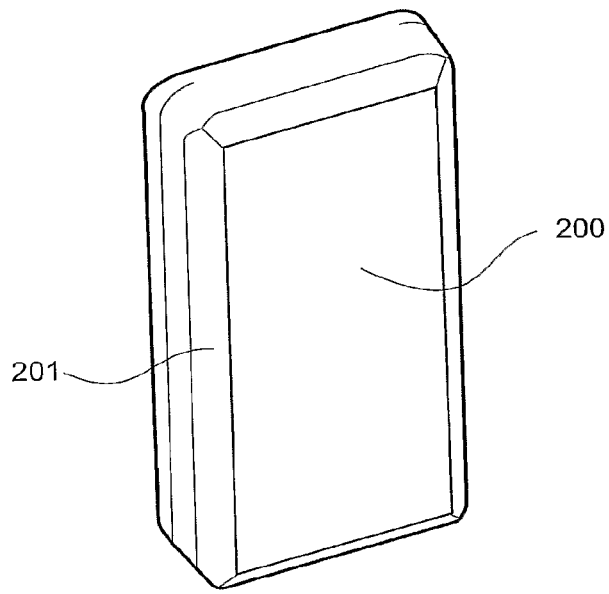
FIG. 20 shows a perspective view of a chamfered magnet element.

FIG. 20 shows a perspective view of a magnet element 200 with chamfered edges 201.

Figure 21:
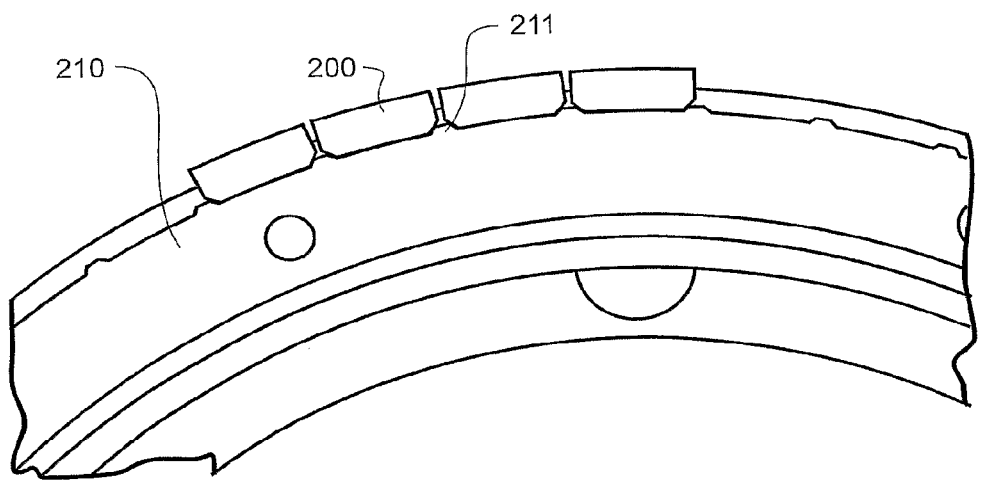
FIG. 21 shows chamfered magnet elements keyed onto a core ring.

The chamfers provide an additional advantage of enabling the magnet elements 200 to key into place on the core ring 210 of a rotor during production, as shown in FIG. 21. Protrusions 211 in the core ring assist keying and enable accurate positioning of the magnets. The chamfers also improve the retention of magnet elements in place via overmoulding.

The type of magnetic material used to construct a magnet element can be selected according to the magnetic domain edge angle. As described previously, FIG. 6c shows the ideal relationship between flux linkage and magnetic domain edge angle. As the magnetic domain edge angle increases towards 90°, the flux linkage increases. But, in practice, as the magnetic domain edge angle increases towards 90°, the resulting magnetic flux density decreases at the back edge of the rotor ring (side "D" in FIG. 5a). If the level of flux density is too small, demagnetisation occurs, which is undesirable. Selecting a different magnetic material for the magnetic element can reduce the susceptibility to demagnetisation, thus enabling a higher magnetic domain edge angle to be used.

Figure 22:
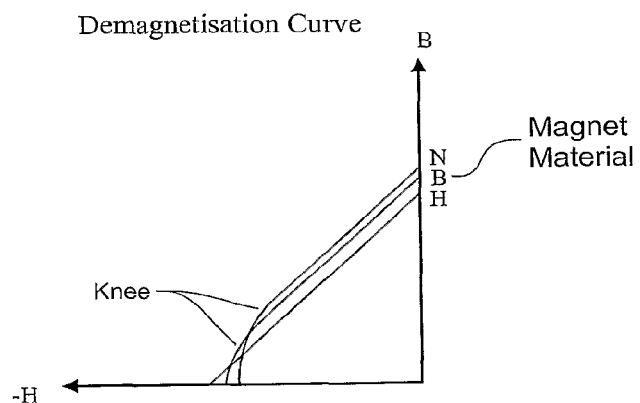
FIG. 22 shows a demagnetisation curve for three different magnet materials.

FIG. 22 shows the demagnetisation curve for three types of magnet materials, being N, B and H materials. As the magnetic domain edge angle increases, the operating point of the magnetic material at the back edge of the rotor ring will move to a more negative H region in the BH curve, resulting in a lower B value. Once the knee of the BH curve is reached, magnetisation drops off rapidly, resulting in demagnetisation. By selecting another magnetic material, the "operating" region of the magnetic material before encountering the knee is increased for a particular edge angle. Therefore, by selection of another material, demagnetisation can be avoided for higher edge angles. Typically, for lower edge angles an N magnet material will be selected, moving towards a B and then H magnet material for higher edge angles. Materials with knees that occur at a more negative B value typically have a lower magnetic strength. Therefore, a material will be selected to maximise flux coupling while avoiding demagnetisation at the desired edge angle.

Figure 23:
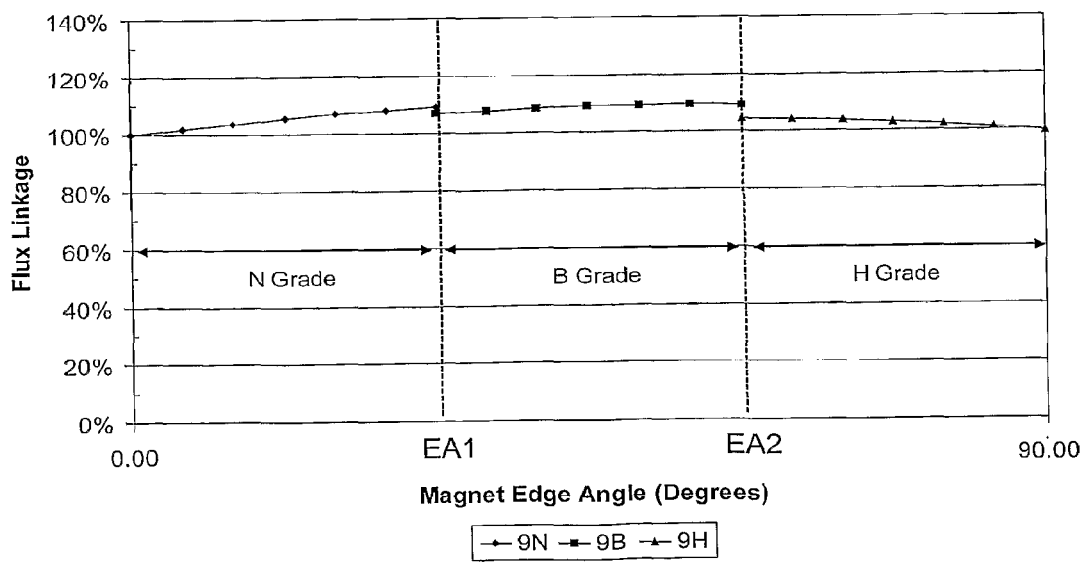
FIG. 23 shows the flux linkage versus angle and magnet grade required to avoid demagnetisation.

FIG. 23 is a graph showing generically the effect of flux linkage versus magnetic domain edge angle using different magnet material. An N grade material provides an increase of flux linkage between 0 and edge angle 1 (EA1). At EA 1 the demagnetisation is unacceptable, so for edge angles between EA1 and EA2 a B grade material is used. The flux linkage is less than for the equivalent edge angle than if the N grade material were used, but the B grade material provides a more acceptable level of magnetisation. Above an edge angle EA 2, a H grade material can be used. Again, it has lower flux linkage, but provides acceptable magnetisation characteristics. The appropriate type of material can be selected based on the desired magnetic domain edge angle for the magnet element. However, it has been found that the gain in flux linkage for higher edge angles has diminishing returns. Therefore, in many cases, a lower edge angle might be selected, as it allows for a magnet grade of higher strength to be used, while still providing an acceptable flux linkage.

Figure 24:
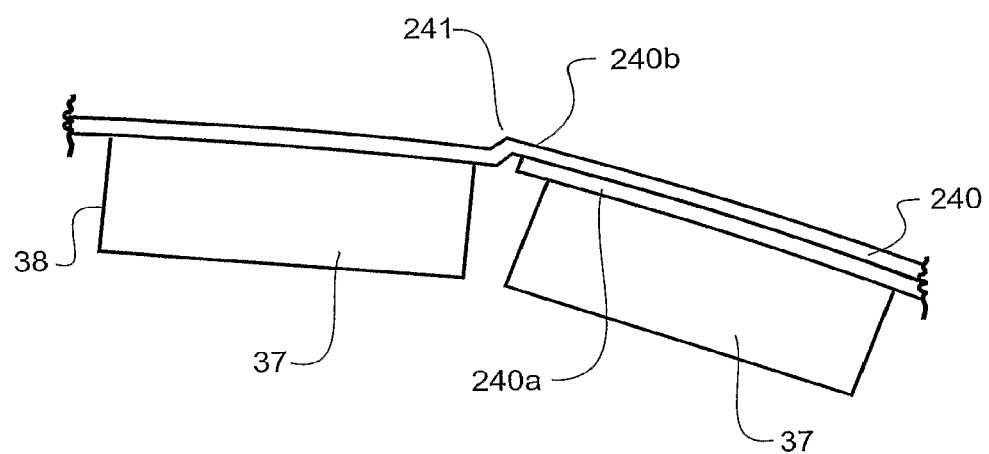
FIG. 24 shows an alternative arrangement for the backing steel.

FIG. 24 shows a possible arrangement of the backing steel of the rotor. Here the backing steel 240 is overlayed to create a "joggle" 241. The joggle reduces the airgap behind one magnet as the steel strip 240 from the second layer 240b ramps up over the start of the first layer 204a. Benefits are:
 a) a better retention of magnets on the core ring, and
 b) avoidance of an increased reluctance path for the flux passing through the magnet into the backing ring.

What is claimed is:
1. A rotor comprising:
 a plurality of permanent magnet elements with two lateral edge surfaces, each magnet element of the plurality of magnet elements having magnetic domains aligned anisotropically to form a magnetic domain alignment pattern, the plurality of magnets being arranged to form a permanent magnet ring with an inner face and an outer face, said permanent magnet ring being between 150 mm and 400 mm in diameter, less than 100 mm in height and less than 20 mm thick, and
 a rigid support holding said magnet elements in said ring arrangement,
 wherein the magnetic domain alignment pattern in each magnet element has an orientation that varies substantially continuously across the whole magnet element between its lateral edge surfaces from an orientation that has a predominant radial component at a pole of the magnet element to an orientation that has a predominant radial component and at least some tangential component at one lateral edge surface of the magnet element,
 wherein the magnet elements are magnetised to produce a resulting magnetic flux field.

2. A rotor according to claim 1 wherein each magnet element has the pole positioned between the magnet element's lateral edge surfaces and the magnetic domain alignment pattern in each magnet element has an orientation that varies substantially continuously across the width of the magnet element from an orientation that has a predominant radial component at the pole of the magnet element to an orientation that has a predominant radial component and at least some tangential component at both lateral edge surfaces of the magnet element.

3. A rotor according to claim 2 wherein at both lateral edge surfaces the orientation of the magnetic domain alignment pattern has a significant tangential component, and the significant tangential component results in the magnetic domain alignment pattern having an orientation of at least 15 degrees, with respect to the lateral edge surfaces.

4. A rotor according to claim 2 wherein at both lateral edge surfaces the orientation of the magnetic domain alignment pattern has a significant tangential component, and the significant tangential component results in the magnetic domain alignment pattern having an orientation of between 20 to 35 degrees, with respect to the lateral edge surfaces.

5. A rotor according to claim 2 wherein at both lateral edge surfaces the orientation of the magnetic domain alignment pattern has a significant tangential component, and the significant tangential component results in the magnetic domain alignment pattern having an orientation of substantially 30 degrees, with respect to the lateral edge surfaces.

6. A rotor according to claim 1 wherein the radial and tangential components of the orientation of the magnetic domain alignment pattern within the magnet element vary sinusoidally according to:

$$V_R = \cos(\theta), \text{ and}$$

$$V_T = \sin(\theta)$$

where $V_R$ and $V_T$ are the radial and tangential components of the orientation respectively and $\theta$ is the angular position across the magnet element.

7. A rotor according to claim 1 wherein the resulting magnetic flux field has poles with alternating polarity spaced around the ring, the poles being aligned radially with respect to the permanent magnet ring, and wherein the resulting magnetic flux field of the permanent magnet ring traverses between adjacent poles of opposite polarities and between those poles is focused to extend beyond the boundary defined by the inner face, but remain at least partially constrained within the boundary defined by the outer face of the permanent magnet ring.

8. A rotor according to claim 7 wherein the portion of the resulting magnetic flux field in each magnet element has an orientation that varies substantially continuously over the magnet element wherein:
 across the width of the magnet element, the orientation varies from an orientation that has a predominant radial component at the pole to an orientation that has a predominant tangential component at the edges of the magnet element adjacent other magnet elements in the permanent magnet ring, and
 across the depth of the magnet element, the orientation varies from an orientation that has a predominant radial component at an edge corresponding to the inner face of the permanent magnet ring to an orientation that has a predominant tangential component at an edge corresponding to the outer face of the permanent magnet ring.

9. A rotor according to claim 1 wherein for each magnet element, the magnetic domains were aligned during production using an injection moulding tool comprising one or more elements defining a cavity, and an apparatus for applying a magnetic flux field, wherein the apparatus produces a magnetic field in the cavity similar in nature to the desired magnetic domain alignment pattern in the element.

10. A rotor according to claim 1 wherein the rotor is utilised in the drive motor of a washing machine comprising an electronically commutated motor, a stator of the motor having windings energisable to cause rotation of the rotor, said stator being coupled to a non-rotating tub or housing of the washing machine, said rotor being coupled to a rotating drum of the washing machine.

11. An appliance with a drive motor, the drive motor comprising a stator, and a rotor according to claim 1.

12. A rotor according to claim 1 for use in a motor for a washing machine, said motor comprising:
a stator having at least three phase windings, each phase winding being formed on a plurality of radially extending stator teeth,
the rotor concentric with said stator with the permanent magnet ring outside said stator teeth and said rotor poles facing the ends of said stator teeth.

13. A rotor according to claim 1 for use in a top loading washing machine comprising an outer wrapper, a tub suspended in the outer wrapper, and a rotating drum, wherein the rotor is coupled to the drum.

14. A rotor according to claim 1, wherein the resulting magnetic flux field exists in the absence of any externally-applied magnetic field.

15. A rotor according to claim 1, wherein the magnet elements have a chamfer at the intersection of each lateral edge with the front edge, wherein the front edge is the edge at the inner face of the rotor.

16. A rotor according to claim 1, wherein the orientation of the magnetic domain alignment pattern does not vary with radial position.

17. A rotor comprising:
a plurality of permanent magnet elements with two lateral edge surfaces, each magnet element of the plurality of magnet elements having magnetic domains aligned anisotropically to form a magnetic domain alignment pattern, the plurality of magnets being arranged to form a permanent magnet arrangement, and
a rigid support holding said magnet elements in said arrangement,
wherein the magnetic domain alignment pattern in each magnet element has an orientation that varies substantially continuously across the whole magnet element between its lateral edge surfaces from an orientation that has a predominant radial component at a pole of the magnet element to an orientation that has a predominant radial component and at least some tangential component at one lateral edge surface of the magnet element,
wherein the magnet elements are magnetised to produce a resulting magnetic flux field.

18. A rotor according to claim 17 wherein for each magnet element, the magnetic domains were aligned during production using an injection moulding tool comprising one or more elements defining a cavity, and an apparatus for applying a magnetic flux field, wherein the apparatus produces a magnetic field in the cavity similar in nature to the desired magnetic domain alignment pattern in the element.

19. A permanent magnet element for assembly into a ring of magnet elements to form part of a rotor, the magnet element having two lateral edge surfaces, each magnet element of the plurality of magnet elements having magnetic domains aligned anisotropically to form a magnetic domain alignment pattern, wherein the magnetic domain alignment pattern in the magnet element has an orientation that varies substantially continuously across the whole magnet element between its lateral edge surfaces from an orientation that has a predominant radial component at a pole of the magnet element to an orientation that has a predominant radial component and at least some tangential component at one lateral edge surface of the magnet element.

20. A magnet element according to claim 19 wherein the pole is positioned between the magnet element's lateral edge surfaces and the magnetic domain alignment pattern in each magnet element has an orientation that varies substantially continuously across the width of the magnet element from an orientation that has a predominant radial component at the pole of the magnet element to an orientation that has at least some tangential component at both lateral edge surfaces of the magnet element.

21. A magnet element according to claim 20 wherein at both lateral edge surfaces the orientation of the magnetic domain alignment pattern has a significant tangential component, wherein the significant tangential component results in the magnetic domain alignment pattern having an orientation of at least 15 degrees, with respect to the lateral edge surfaces.

22. A magnet element according to claim 20 wherein at both lateral edge surfaces the orientation of the magnetic domain alignment pattern has a significant tangential component, wherein the significant tangential component results in the magnetic domain alignment pattern having an orientation of between 20 degrees to 35 degrees, with respect to the lateral edge surfaces.

23. A magnet element according to claim 20 wherein at both lateral edge surfaces the orientation of the magnetic domain alignment pattern has a significant tangential component, wherein the significant tangential component results in the magnetic domain alignment pattern having an orientation of substantially 30 degrees, with respect to the lateral edge surfaces.

24. A magnet element according to claim 19 wherein the radial and tangential components of the orientation of the magnetic domain alignment pattern within the magnet element vary sinusoidally according to:

$V_R = \cos(\theta)$, and $V_T = \sin(\theta)$ where $V_R$ and $V_T$ are the radial and tangential components of the orientation respectively and $\theta$ is the angular position across the magnet element.

* * * * *